(12) United States Patent
Schrage et al.

(10) Patent No.: US 9,770,686 B2
(45) Date of Patent: *Sep. 26, 2017

(54) PROCESS AND MATERIALS USING Z-FILTER MEDIA, AND/OR, CLOSING FLUTES OF FILTER MEDIA; AND, PRODUCTS

(71) Applicant: Donaldson Company, Inc., Minneapolis, MN (US)

(72) Inventors: Kevin Schrage, Spring Valley, MN (US); Eugene Lensing, Spillville, IA (US); Donald Mork, Lime Springs, IA (US); Troy Murphy, Cresco, IA (US); Jeff Rahlf, Elma, IA (US); Gregory Reichter, Bloomington, MN (US); Daniel Risch, Burnsville, MN (US)

(73) Assignee: Donaldson Company, Inc., Minneapolis, MN (US)

(*) Notice: Subject to any disclaimer, the term of this patent is extended or adjusted under 35 U.S.C. 154(b) by 91 days.

This patent is subject to a terminal disclaimer.

(21) Appl. No.: 14/627,365

(22) Filed: Feb. 20, 2015

(65) Prior Publication Data

US 2015/0231547 A1    Aug. 20, 2015

Related U.S. Application Data

(63) Continuation of application No. 13/953,188, filed on Jul. 29, 2013, now Pat. No. 8,961,722, which is a (Continued)

(51) Int. Cl.
*B01D 46/52* (2006.01)
*B01D 46/00* (2006.01)
(Continued)

(52) U.S. Cl.
CPC ......... *B01D 46/525* (2013.01); *B01D 29/012* (2013.01); *B01D 29/071* (2013.01);
(Continued)

(58) Field of Classification Search
CPC .............. B01D 46/0001; B01D 46/525; B01D 46/527; B01D 2271/022
See application file for complete search history.

(56) References Cited

U.S. PATENT DOCUMENTS

| 3,025,963 A | 3/1962 | Bauer |
| 3,878,594 A | 4/1975 | Minor, Jr. et al. |

(Continued)

FOREIGN PATENT DOCUMENTS

| DE | 3405719 | 2/1984 |
| EP | 0 630 672 A | 12/1994 |

(Continued)

OTHER PUBLICATIONS

Pending claims of U.S. Appl. No. 14/280,927 as of Jan. 19, 2017.
(Continued)

*Primary Examiner* — Robert Clemente
(74) *Attorney, Agent, or Firm* — Merchant & Gould P.C.

(57) ABSTRACT

Approaches to providing z-filter media constructions are provided. Preferred media, filter constructions having such media, and filter systems using such filter constructions are provided. Also, preferred methods of forming filter constructions are provided.

10 Claims, 18 Drawing Sheets

Related U.S. Application Data continuation of application No. 13/555,327, filed on Jul. 23, 2012, now Pat. No. 8,496,774, which is a continuation of application No. 10/549,872, filed as application No. PCT/US2004/007927 on Mar. 17, 2004, now Pat. No. 8,226,786.

(60) Provisional application No. 60/455,643, filed on Mar. 18, 2003, provisional application No. 60/466,026, filed on Apr. 25, 2003, provisional application No. 60/467,521, filed on May 2, 2003.

(51) Int. Cl.
| | | |
|---|---|---|
| *B01D 29/07* | (2006.01) | |
| *B01D 29/01* | (2006.01) | |
| *B32B 37/18* | (2006.01) | |
| *B32B 37/12* | (2006.01) | |
| *B32B 38/00* | (2006.01) | |

(52) U.S. Cl.
CPC ....... *B01D 46/0001* (2013.01); *B01D 46/527* (2013.01); *B32B 37/12* (2013.01); *B32B 37/18* (2013.01); *B32B 38/0012* (2013.01); *B01D 2271/022* (2013.01)

(56) References Cited

U.S. PATENT DOCUMENTS

| | | |
|---|---|---|
| 3,966,646 A | 6/1976 | Noakes et al. |
| 4,410,427 A | 10/1983 | Wydeven |
| 4,430,223 A | 2/1984 | Miyakawa et al. |
| 4,589,983 A | 5/1986 | Wydevan |
| 4,925,561 A | 5/1990 | Ishii et al. |
| 5,222,488 A | 6/1993 | Forsgren et al. |
| 5,304,351 A | 4/1994 | Tanaka et al. |
| 5,374,402 A | 12/1994 | Hitachi et al. |
| 5,391,212 A | 2/1995 | Ernst et al. |
| 5,472,463 A | 12/1995 | Herman et al. |
| 5,562,825 A | 10/1996 | Yamada et al. |
| 5,759,217 A | 6/1998 | Joy et al. |
| 5,772,883 A | 6/1998 | Rothman et al. |
| D396,098 S | 7/1998 | Gillingham et al. |
| 5,792,247 A | 8/1998 | Gillingham et al. |
| 5,795,361 A | 8/1998 | Lanier, Jr. et al. |
| D398,046 S | 9/1998 | Gillingham et al. |
| D399,944 S | 10/1998 | Gillingham et al. |
| 5,820,646 A | 10/1998 | Gillingham |
| 5,891,402 A | 4/1999 | Sassa et al. |
| 5,895,574 A | 4/1999 | Friedmann et al. |
| 5,902,364 A | 5/1999 | Tokar et al. |
| D417,268 S | 11/1999 | Gillingham |
| 6,048,386 A | 4/2000 | Gillingham et al. |
| D425,189 S | 5/2000 | Gillingham et al. |
| D428,128 S | 7/2000 | Gillingham et al. |
| 6,179,890 B1 | 1/2001 | Ramos |
| D437,402 S | 2/2001 | Gieseke et al. |
| 6,190,432 B1 | 2/2001 | Gieseke et al. |
| 6,210,469 B1 | 4/2001 | Tokar |
| 6,235,195 B1 | 5/2001 | Tokar |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieske et al. |
| 6,368,374 B1 | 4/2002 | Tokar |
| 6,375,700 B1 | 4/2002 | Jaroszczyk et al. |
| D460,169 S | 7/2002 | Anderson et al. |
| D461,003 S | 7/2002 | Gieseke et al. |
| 6,416,605 B1 | 7/2002 | Golden |
| D461,884 S | 8/2002 | Gieseke et al. |
| D464,129 S | 10/2002 | Xu et al. |
| D466,602 S | 12/2002 | Gieseke et al. |
| 6,517,598 B2 | 2/2003 | Anderson et al. |
| D473,637 S | 4/2003 | Golden |
| 6,610,117 B2 | 8/2003 | Gieseke et al. |
| 6,610,126 B2 | 8/2003 | Xu et al. |
| D483,459 S | 12/2003 | Dewit |
| D484,584 S | 12/2003 | Anderson |
| 6,673,136 B2 | 1/2004 | Gillingham et al. |
| 6,743,317 B2 | 6/2004 | Wydeven |
| 6,783,565 B2 | 8/2004 | Gieseke et al. |
| D497,202 S | 10/2004 | Carter et al. |
| 6,852,141 B2 | 2/2005 | Bishop et al. |
| D506,539 S | 6/2005 | Bishop et al. |
| 6,953,124 B2 | 10/2005 | Winter et al. |
| 7,090,712 B2 | 8/2006 | Gillingham et al. |
| 7,258,719 B2 | 8/2007 | Miller et al. |
| 7,282,075 B2 | 10/2007 | Sporre et al. |
| 7,303,604 B2 | 12/2007 | Gieseke et al. |
| 7,323,029 B2 | 1/2008 | Olson et al. |
| 7,329,326 B2 | 2/2008 | Wagner et al. |
| 7,364,601 B2 | 4/2008 | Xu et al. |
| 7,396,375 B2 | 7/2008 | Nepsund et al. |
| 7,396,376 B2 | 7/2008 | Schrage et al. |
| 7,488,365 B2 | 2/2009 | Golden et al. |
| 7,635,403 B2 | 12/2009 | Nepsund et al. |
| 7,645,310 B2 | 1/2010 | Krisko et al. |
| 7,655,074 B2 | 2/2010 | Nepsund et al. |
| 7,674,308 B2 | 3/2010 | Krisko et al. |
| 7,678,170 B2 | 3/2010 | Pfeiffer et al. |
| 7,682,416 B2 | 3/2010 | Engelland et al. |
| 7,967,886 B2 | 6/2011 | Schrage et al. |
| 8,034,145 B2 | 10/2011 | Boehrs et al. |
| 8,226,786 B2 | 7/2012 | Schrage et al. |
| 8,241,383 B2 | 8/2012 | Schrage et al. |
| 8,496,774 B2 | 7/2013 | Schrage et al. |
| 8,518,141 B2 | 8/2013 | Schrage et al. |
| 8,685,130 B2 | 4/2014 | Nelson et al. |
| 8,728,193 B2 | 5/2014 | Flagstad et al. |
| 8,734,557 B2 | 5/2014 | Rocklitz et al. |
| 8,961,722 B2 | 2/2015 | Schrage et al. |
| 9,242,199 B2 | 1/2016 | Nelson et al. |
| 9,555,370 B2 | 1/2017 | Flagstad et al. |
| 2001/0032545 A1 | 10/2001 | Goto et al. |
| 2002/0073850 A1 | 6/2002 | Tokar et al. |
| 2002/0096247 A1 | 7/2002 | Wydeven |
| 2002/0185007 A1 | 12/2002 | Xu et al. |
| 2004/0040271 A1 | 3/2004 | Kopec et al. |
| 2004/0060861 A1 | 4/2004 | Winter et al. |
| 2004/0221555 A1 | 11/2004 | Engelland et al. |
| 2005/0077229 A1 | 4/2005 | Ishii |
| 2005/0166561 A1 | 8/2005 | Schrage et al. |
| 2006/0090434 A1 | 5/2006 | Brown et al. |
| 2006/0163150 A1 | 7/2006 | Golden et al. |
| 2007/0039296 A1 | 2/2007 | Schrage et al. |
| 2008/0307759 A1 | 12/2008 | Reichter et al. |
| 2009/0064646 A1 | 3/2009 | Reichter et al. |
| 2009/0151311 A1 | 6/2009 | Reichter et al. |

FOREIGN PATENT DOCUMENTS

| | | |
|---|---|---|
| EP | 1 712 266 | 10/2006 |
| JP | 1-171615 | 7/1989 |
| WO | WO 97/40917 | 11/1997 |
| WO | WO 97/40918 A | 11/1997 |
| WO | WO 2004/007054 | 1/2004 |
| WO | WO 2004/020075 | 3/2004 |
| WO | WO 2005/077487 | 8/2005 |
| WO | WO 2008/095196 | 8/2008 |

OTHER PUBLICATIONS

Pending claims of U.S. Appl. No. 15/004,364 as of Jan. 19, 2017.
U.S. Appl. No. 60/543,804, filed Feb. 11, 2004, Boehrs et al.
U.S. Appl. No. 60/543,702, filed Feb. 10, 2004, Boehrs et al.
PCT Search Report and Written Opinion Corresponding to PCT/US2004/007927 dated Sep. 14, 2004.
Declaration of Kevin Schrage dated Oct. 27, 2011.
Pending claims of U.S. Appl. No. 15/417,389 as of May 8, 2017.

PROCESS AND MATERIALS USING Z-FILTER MEDIA, AND/OR, CLOSING FLUTES OF FILTER MEDIA; AND, PRODUCTS

CROSS REFERENCE TO RELATED APPLICATIONS

The present application is a continuation application of U.S. Ser. No. 13/953,188, filed Jul. 29, 2013, which issued as U.S. Pat. No. 8,961,722 on Feb. 24, 2015. U.S. Ser. No. 13/953,188 is a continuation of U.S. Ser. No. 13/555,327, filed Jul. 23, 2012, which has issued as U.S. Pat. No. 8,496,774. U.S. Ser. No. 13/555,327 is a continuation of U.S. Ser. No. 10/549,872, filed Sep. 11, 2006, which issued as U.S. Pat. No. 8,226,786. U.S. Ser. No. 10/549,872 is a National Stage application of PCT application PCT/U.S. 2004/007927, which was filed Mar. 17, 2004 with a claim of priority to three U.S. provisional applications as follows: 60/455,643 filed Mar. 18, 2003; 60/466,026 filed Apr. 25, 2003; and 60/467,521 filed May 2, 2003. A claim of priority is made to each of U.S. Ser. Nos. 13/953,188; 13/555,327; 10/549,872; PCT/US2004/007927; 60/455,643; 60/466,026; and, 60/467,521, to the extent appropriate. Also, each of U.S. Ser. Nos. 13/953,188; 13/555,327; 10/549,872; PCT/US2004/007927; 60/455,643; 60/466,026; and, 60/467,521 is incorporated herein by reference.

FIELD OF THE DISCLOSURE

The present disclosure relates to filter media for use in filtering liquids or gases. The disclosure particularly relates to such media that utilizes a fluted or corrugated structure, to define filtration flutes or surfaces. Specifically, the disclosure relates to techniques for sealing such flutes in selected portions thereof, and to resulting structures.

BACKGROUND

Fluid streams, such as air and liquid, carry contaminant material therein. In many instances, it is desired to filter some or all of the contaminant material from the fluid stream. For example, air flow streams to engines (for example as combustion air) for motorized vehicles or for power generation equipment, gas streams to gas turbine systems and air streams to various combustion furnaces, carry particulate contaminant therein that should be filtered. Also liquid streams in engine lube systems, hydraulic systems, coolant systems or fuel systems, carry contaminant, that should be filtered. It is preferred for such systems, that selected contaminant material be removed from (or have its level reduced in) the fluid. A variety of fluid filter (air or liquid filter) arrangements have been developed for contaminant reduction. In general, however, continued improvements are sought.

SUMMARY

The present disclosure concerns z-filter arrangements, preferably constructed utilizing the methods and equipment described herein.

Certain of the disclosed methods involve selective coiling of z-filter media. Some preferred applications and methods involve z-filter media that uses sealant such as a urethane sealant material, to cause sealing to occur. Preferred applications are described. Also, methods for preparing preferred filter arrangements are provided.

BRIEF DESCRIPTION OF THE DRAWINGS

In the following drawings, relative dimensions and material thickness may be shown exaggerated for clarity.

DETAILED DESCRIPTION

Figure 1:
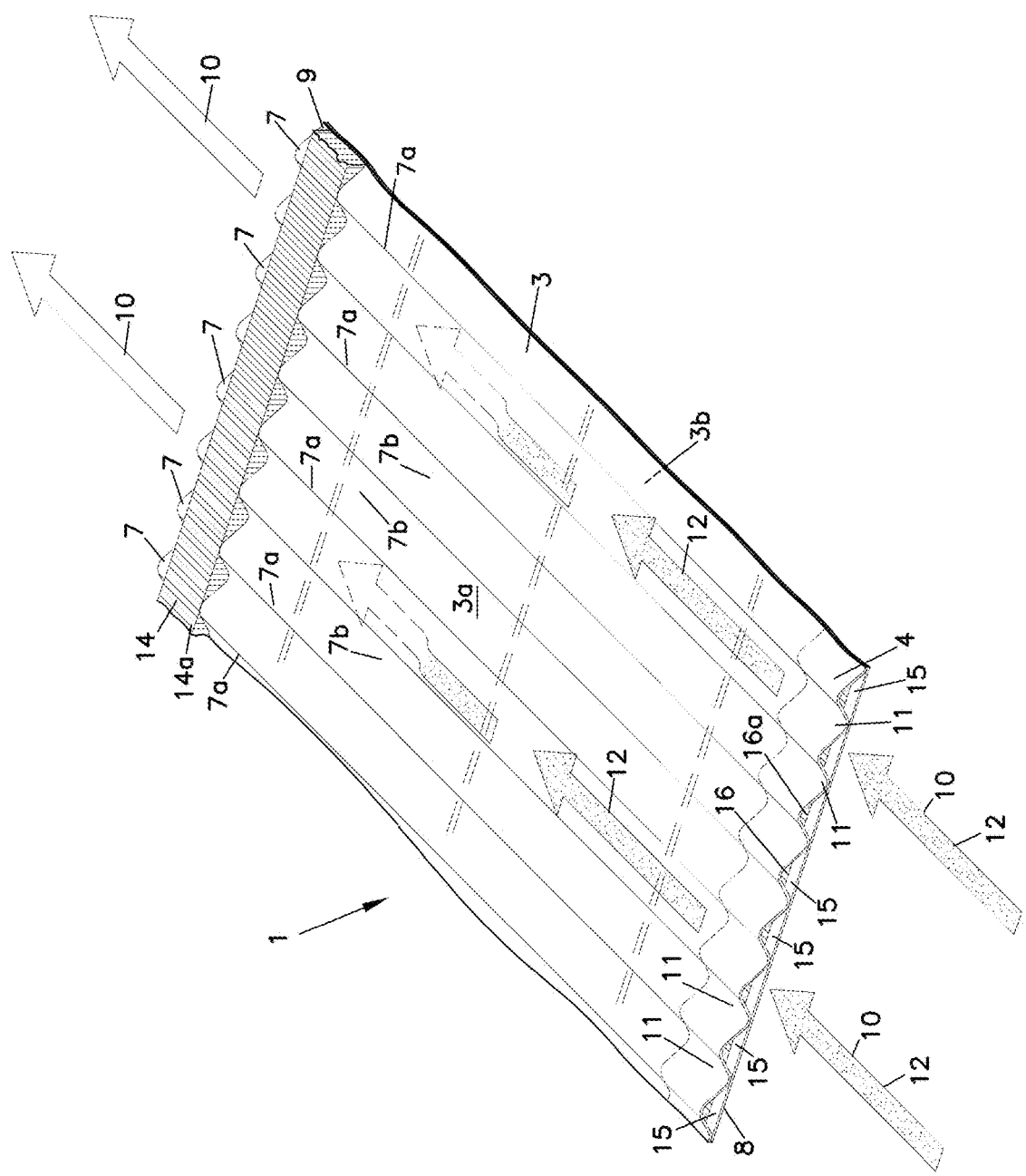
FIG. 1 is a schematic perspective view of z-filter media.

I. Media Configurations Using Fluted Media, Generally

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of parallel longitudinal inlet and outlet filter flutes for fluid flow through the media; the fluid flowing along the length of the flutes. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401.

In general, as will be apparent from the following, z-filter media has a set of inlet flutes and a set of outlet flutes. According to the present disclosure, preferably at least one of these sets is sealed closed by urethane sealant. Preferred configurations have both sets sealed closed by urethane sealant.

One particular type of z-filter media, utilizes two specific media components joined together, to form the media construction. The two components are: a fluted (typically corrugated) sheet; and, a non-fluted, non-corrugated (flat) facing sheet. The fluted (typically corrugated) media and the non-fluted, non-corrugated (or facing) sheet together, are used to define parallel inlet and outlet flutes. In some instances, the fluted sheet and non-fluted sheet are secured together and are then coiled to form a z-filter media construction. Such arrangements are described, for example, in U.S. Pat. Nos. 6,235,195 and 6,179,890. In certain other arrangements, some non-coiled sections of corrugated media secured to flat media, are stacked on one another, to create a filter construction. An example of this is described in FIG. 11 of U.S. Pat. No. 5,820,646. Herein the facing sheet may be characterized as flat, if it is non-corrugated and non-fluted, even if it is coiled in the filter media construction.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are scored and folded or otherwise formed by techniques not involving passage of media into a bite between corrugation rollers. However, the term "corrugated" is meant to apply even if the media is further modified or deformed after corrugation, for example by the folding techniques described in PCT/US03/02799, incorporated herein by reference.

Corrugated media is a specific form of fluted media. Fluted media is media which has individual flutes (for example formed by corrugating or folding) extending thereacross.

Serviceable filter element or cartridge configurations utilizing z-filter media are sometimes referred to as "straight through flow configurations" or by variants thereof. In general, in this context what is meant is that the serviceable filtered elements generally have an inlet flow face and an opposite exit flow face, with flow entering and exiting the filter cartridge in generally the same straight through direction. The term "serviceable" in this context is meant to refer to a media containing filter cartridge that is periodically removed and replaced from a corresponding fluid cleaner. In many instances, each of the inlet flow face and outlet flow face will be generally flat, with the two parallel to one another. However, variations from this are possible.

The straight through flow configuration is in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a side, and then turns to exit through an end face (in forward-flow systems). In reverse-flow systems, the flow enters the serviceable cylindrical cartridge through an end face and then turns to exit through a side of the filter cartridge. An example of a reverse-flow system is shown in U.S. Pat. No. 5,613,992, incorporated by reference herein.

Figure 2:
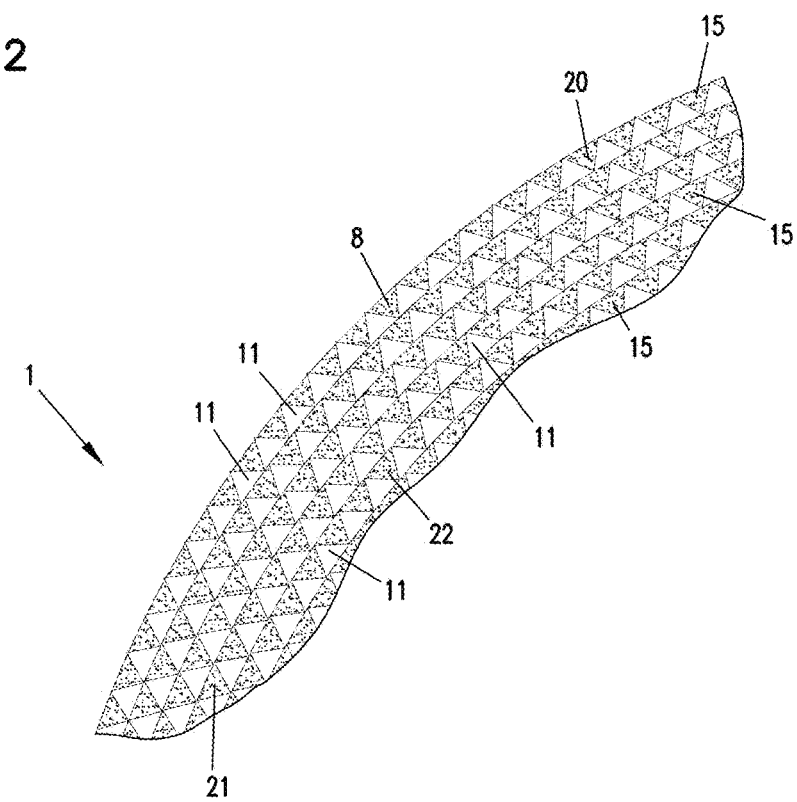
FIG. 2 is a schematic upstream end view of a filter element utilizing coiled media according to FIG. 1.
Figure 3:
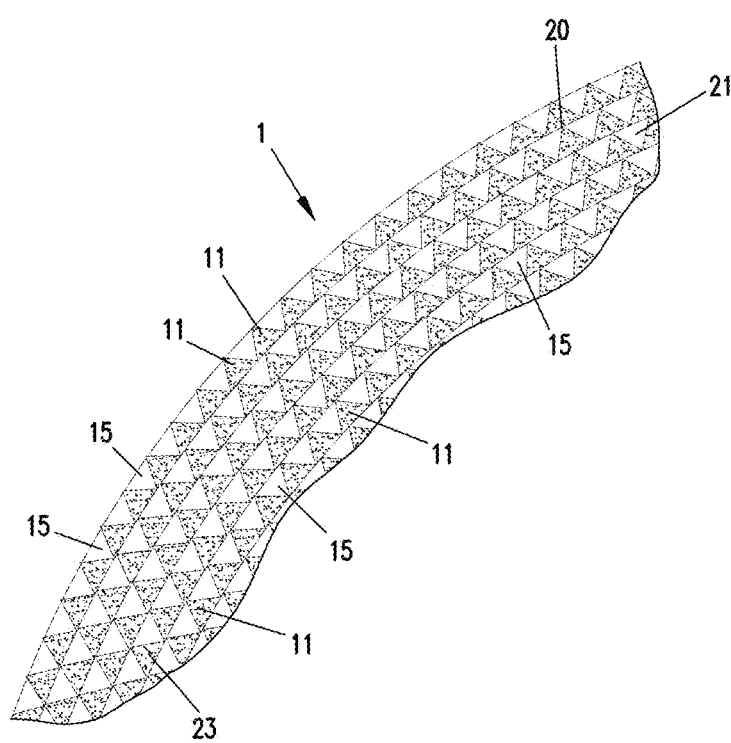
FIG. 3 is a schematic outlet end view of the arrangement depicted in FIG. 1.
Figure 4:
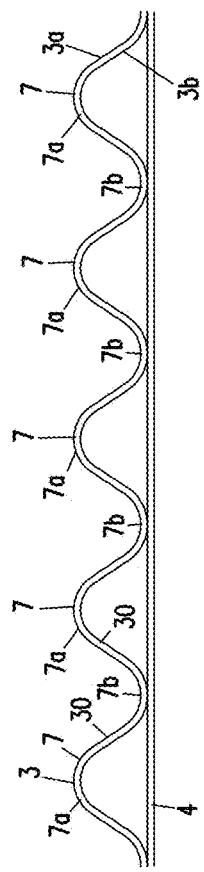
FIG. 4 is a schematic enlarged fragmentary view of a portion of corrugated media attached to a portion of uncorrugated media, in a z-filter construction.

An example of a typical z-filter media construction is shown in FIGS. 1-4. FIG. 1 is a schematic perspective view. FIG. 2 is an enlarged end view of an inlet end portion of a straight through flow filter element using a media construction made with the media shown in FIG. 1. FIG. 3 is an enlarged end view of and analogous to FIG. 2, but of an opposite, outlet, end. FIG. 4 is an enlarged, schematic, view of a combination of corrugated sheet and non-corrugated sheets.

The term "z-filter media construction" and variants thereof as used herein, is meant to refer to any or all of: a web of corrugated or otherwise fluted media secured to non-corrugated, non-fluted, (facing) media with appropriate sealing to allow for definition of inlet and outlet flutes; or, such a media coiled or otherwise constructed or formed into a three dimensional network of inlet and outlet flutes; and/or, a filter construction including such media.

Referring to FIG. 1, the z-filter media construction 1 depicted comprises a fluted sheet, in this instance corrugated sheet 3, and a non-corrugated facing sheet 4 secured to one another. The fluted or corrugated sheet 3 is secured to the non-corrugated sheet 4 such that individual flutes or corrugations 7 (comprising ridges 7a and troughs 7b when viewed toward side 3a of sheet 3) extend across the non-corrugated sheet 4 between opposite ends or edges 8 and 9. For the final product, it is a matter of choice whether end (or edge) 8 or end (or edge) 9 is the upstream end or edge. For purposes of the following discussion, it will be assumed that edge 8 is chosen to be the upstream edge and edge 9 is chosen to be the downstream edge, in the resulting filter media construction. Thus, arrows 10 indicate the direction of fluid flow, during filtering.

Referring to FIG. 1, the corrugated sheet 3 has first and second opposite sides or surfaces 3a, 3b. The second side 3b is the side directed toward the non-corrugated sheet 4, during initial assembly of the corrugated sheet 3/flat sheet 4 combination as discussed below; i.e., when the corrugated sheet 3 is first brought into contact with the non-corrugated sheet 4. (The second side 3b will sometimes be referred herein as the front side, and the opposite side 3a as the back side.)

At the upstream edge 8, flutes 11 defined by troughs 7b of the corrugations 7 above the corrugated sheet 3, i.e., at side 3a of sheet 3 are open to fluid flow therein in the direction of arrows 12, along the upstream edge 8, but are closed to fluid flow therefrom along the downstream edge 9, by barrier 14, in this instance sealant 14a. On the other hand, flutes 15, defined by corrugations 7a on the opposite side 3b of the corrugated sheet 3 from flutes 11, are closed to entrance of fluid therein along the upstream edge 8, by barrier 16, in this instance sealant 16a, but are open to fluid flow outwardly therefrom, along edge 9, by the absence of any sealant at this location.

In various prior art z-filter arrangements, a hot melt sealant was used. According to the present disclosure, and the disclosure of U.S. provisional 60/455,643, a preferred sealant material is utilized for one or more of the sealants 14a, 16a. In particular, urethane sealant material, for example a foamed urethane as described herein below in Section III is used.

Of course in the arrangement of FIG. 1, the media is shown not secured in an overall three-dimensional filter element cartridge structure, that would complete creation of the isolated parallel flutes 11, 15. This is shown in fragmentary, schematic, in FIG. 2. Referring to FIG. 2, the media construction 1 is now shown configured in an overall three-dimensional media pack 20. In general media pack 20, for the embodiment shown, would comprise the media construction 1 of FIG. 1, coiled about itself to create a cylindrical fluted construction 21. A complete drawing would typically show a circular or obround filter body. In FIG. 2, only a portion of such a coiled construction 21 is depicted, in particular a portion when viewed toward an upstream surface 22. Herein the term "upstream" when used in this or similar contexts to refer to a surface or edge, is meant to refer to the surface or edge toward which fluid is directed, for a filtering process. That is, the upstream surface or edge is the surface or edge at which the fluid to be filtered enters the z-filter construction 21. Analogously, the term "downstream" when used to refer to an edge or surface, is meant to refer to the edge or surface of a construction 21 from which filtered fluid exits the filtered media construction 21, during use.

It is noted that in FIGS. 2 and 3, the flutes 11, 15 are depicted schematically, as if they have triangular, cross-sections, for simplicity. The actual curved shape of FIG. 1 would be present in the actual filter, assuming corrugations similar to FIG. 1 were used.

Referring to FIG. 2, at upstream edge 8 or along upstream surface 22, the fluid flow openings in inlet flutes 11 are generally indicated by the absence of barrier or sealant. Thus inlet flutes 11 are open to the passage of fluid flow therein. The closed upstream ends of exit flutes 15 are also shown, by the presence of a barrier, in this instance sealant. Thus, fluid flow directed against upstream surface 22 can only pass into the media construction 20, for filtering, by entering the inlet flutes 11. It is noted that in some instances, at the upstream edge 8, the outlet flutes may not be sealed immediately at the edge 8, but rather may be sealed by a sealant spaced inwardly from the edge 8, a portion of the way down the length of the corresponding flute. An example of this is shown, for example, in U.S. Pat. No. 5,820,646, at FIG. 16 thereof. In general, the inlet end of an exit flute will be considered sealed at or along an edge or end, as long as the sealant or other structure closing the flute is located (relative to edge 8) either at the edge or no more than 25% (preferably no more than 10%) of the distance between the upstream edge 8 and the opposite downstream edge 9. Usually the sealing is at the edge 8. The description "no more than 25% (or 10%) of the distance between the upstream edge and the opposite downstream edge 9" in this context is meant to include sealing immediately at edge 8.

Referring to FIG. 3, the exit edge 9 of the media, forming exit end or 23 of the filter construction 21. The exit flutes 15 are shown open, and the inlet flutes 11 are shown closed by barrier or sealant. The inlet flutes 11 will be considered sealed at or along the downstream ends, or media edge, as long as the sealant material or other structure closing the flute, is at the exit edge 9, or within a distance from the edge 9 corresponding to no more than 25% of the distance between the opposite edges 8 and 9. For typical, preferred, embodiments the sealed end of each flute 8, 9 would be sealed by sealant positioned at a location within a distance from the closest edge of no more than 10% of the flute length from edge 8 to edge 9. The sealing can be immediate at the edge 9. The description "no more than 25% (or 10%) of the flute length from edge 8 to edge 9" in this context, is meant to include sealing immediately at edge 9.

In general, the corrugated sheet 3, FIG. 1 is of a type generally characterized herein as having a regular, curved, wave pattern of flutes or corrugations. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the ends of the troughs and ridges may vary from one another. Such variations in ends are disregarded in the definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7a of each trough is formed along a radiused curve. A typical radius for such z-filter media would be at least 0.25 mm and typically be not more than 3 mm.

An additional characteristic of the particular regular, curved, wave pattern depicted in FIG. 4, for the corrugated sheet 3, is that at approximately a midpoint 30 between each trough and each adjacent ridge, along most of the length of the flutes, is located a transition region where the curvature inverts. For example, viewing back side face 3a, FIG. 1, trough 7b is a concave region, and ridge 7a is a convex region. Of course when viewed toward front side face 3b, trough 7b of side 3a forms a ridge; and, ridge 7a of face 3a, forms a trough. A characteristic of the particular regular, curved, wave pattern corrugated sheet shown in FIGS. 1-4, is that the individual corrugations are generally straight. By "straight" in this context, it is meant that through at least 70%, typically at least 80% of the length between edges 8 and 9, the troughs do not change substantially in cross-section. The term "straight" in reference to corrugation pattern shown in FIGS. 1-4, in part distinguishes the pattern from the tapered flutes of corrugated media described in FIG. 1 of WO 97/40918. The tapered flutes of FIG. 1 of WO 97/40918 would be a curved wave pattern, but not a "regular" pattern, or a pattern of straight flutes, as the terms are used herein.

For the particular arrangement shown herein in FIG. 1, the parallel corrugations are generally straight completely across the media, from edge 8 to edge 9. Straight flutes or corrugations can be deformed or folded at selected locations, especially at ends. Modifications at flute ends are generally disregarded in the above definitions of "regular," "curved" and "wave pattern."

Attention is again directed to FIG. 3 in which media pack 20 is depicted from a viewpoint directed toward downstream end 23 defined by edge 9 of the z-filter media construction 1. At this end or surface 23, the exit flutes 15 are depicted open and unsealed, and the entrance flutes 11, are shown closed by a barrier, in this case, by sealant, preferably urethane. Thus, the only way fluid can exit from downstream end 23 is by flow outwardly from an open exit flute 15.

As a result of the above described construction, fluid which enters the inlet face 22 can only exit from the opposite exit face 23, if the fluid has passed through the filter media 3, 4. This, in general, is a characteristic of a z-filter media construction in use namely: (a) individual generally parallel flutes are defined by a media, for example corrugated media; and, (b) a closure pattern is provided closing individual ones of a set of exit flutes at the upstream ends and closing individual ones of a set of inlet flutes at the downstream ends, forcing fluid flow (with filtering) through one of the media sheets in order for the fluid to exit from the media pack.

In typical applications involving z-filter media, the media is either surrounded by an impermeable shell (as in U.S. Pat. No. 5,820,646), or has one or more housing seals used at appropriate locations, or both, to prevent fluid flow from going around the media, from a fluid inlet to a fluid outlet. The term "housing seal" in this context is meant to refer to a seal between the filter cartridge (including the media) and a housing in which it is installed, for use.

Attention is again directed to FIG. 4, which is an enlarged, fragmentary, schematic, end view of the z-filter media construction 1, showing the corrugated sheet 3 and the non-corrugated sheet 4, but not barrier or sealant. Again, the configuration of the corrugated sheet, in FIG. 4, will sometimes be referred to herein as a regular, curved, wave pattern of straight flutes.

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. Finally, in WO 97/40918 (FIG. 1), flutes or parallel corrugations which have a curved, wave patterns (from adjacent curved convex and concave troughs) but which taper along their lengths (and thus are not straight) are shown. In general, the filter media is a relatively flexible material, typically a non-woven fibrous material (of cellulose fibers, synthetic fibers or both) typically including a resin therein, sometimes treated with additional materials. Thus, it can be conformed or configured into the various folded or corrugated patterns, without unacceptable media damage. Also, it can be readily coiled or otherwise configured for use, again without unacceptable media damage. Of course, it must be of a nature such that it will maintain a corrugated or folded configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing (noncorrugated) sheet is often tacked to the fluted sheet, to inhibit this spring back.

Also, in general, the media contains a resin. During the corrugation process, the media can be heated to above the glass transition point of the resin. When the resin then cools, it will help to maintain the fluted shapes.

Both of these techniques are generally known in practice, with respect to the formation of corrugated media.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 5:
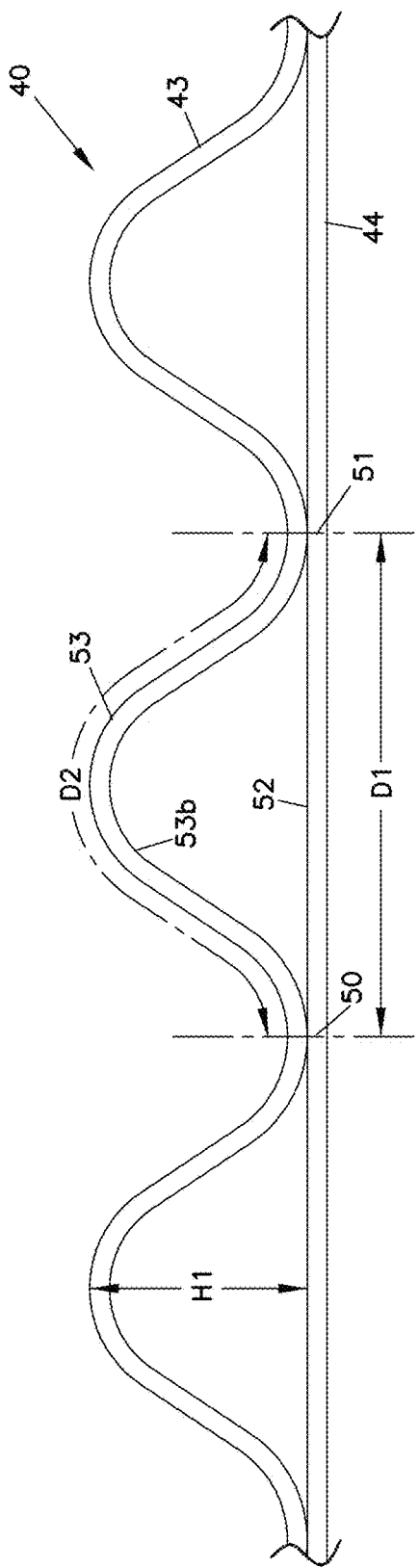
FIG. 5 is an enlarged view of a portion of the media depicted in FIG. 4.

Attention is now directed to FIG. 5, in which a z-filter media construction 40 utilizing a regular, curved, wave pattern corrugated sheet 43, and a non-corrugated flat sheet 44, is depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 20:
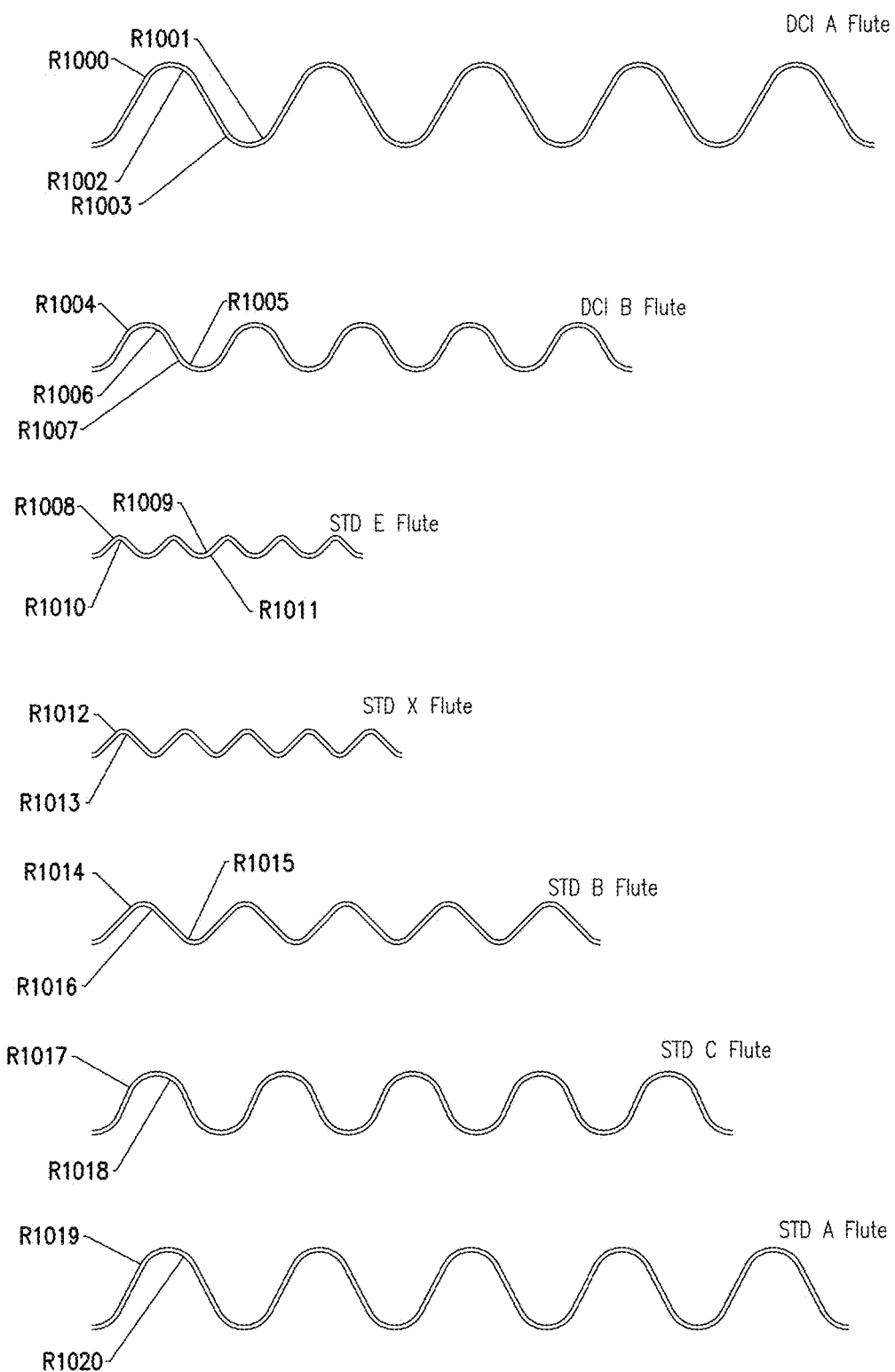
FIG. 20 is a schematic depiction of various flute definitions.

In the corrugated cardboard industry, various standard flutes have been defined. For example the standard E flute, standard X flute, standard B flute, standard C flute and standard A flute. FIG. 20, attached, in combination with Table A below provides definitions of these flutes.

Donaldson Company, Inc., (DCI) the assignee of the present disclosure, has used variations of the standard A and standard B flutes, in a variety of filter arrangements. These flutes are also defined in FIG. 20 and Table A.

TABLE A (Flute definitions for FIG. 20)

| | |
|---|---|
| DCI A: Flute | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |

TABLE A-continued (Flute definitions for FIG. 20)

Std. X Flute: Flute/flat = 1.29:1; The Radii (R) are as follows:
R1012 = .0250 inch (.635 mm); R1013 = .0150 inch (.381 mm);
Std. B Flute: Flute/flat = 1.29:1; The Radii (R) are as follows:
R1014 = .0410 inch (1.041 mm); R1015 = .0310 inch (.7874 mm);
R1016 = .0310 inch (.7874 mm);
Std. C Flute: Flute/flat = 1.46:1; The Radii (R) are as follows:
R1017 = .0720 inch (1.829 mm); R1018 = .0620 inch (1.575 mm);
Std. A Flute: Flute/flat = 1.53:1; The Radii (R) are as follows:
R1019 = .0720 inch (1.829 mm); R1020 = .0620 inch (1.575 mm).

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

Figure 6:
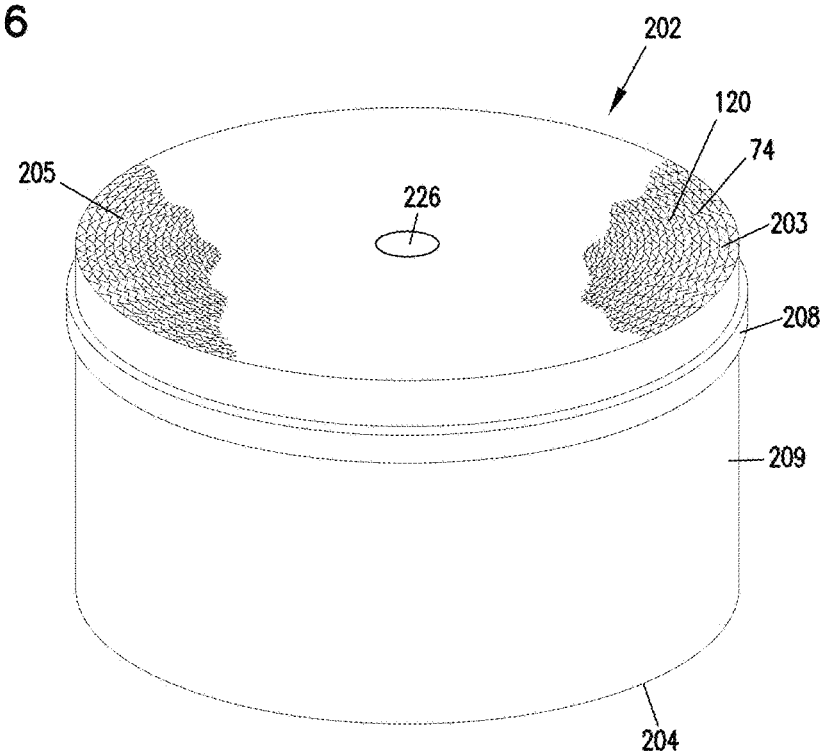
FIG. 6 is a schematic, perspective view of a filter element utilizing fluted filter media having ends sealed in accord with the descriptions herein.
Figure 7:
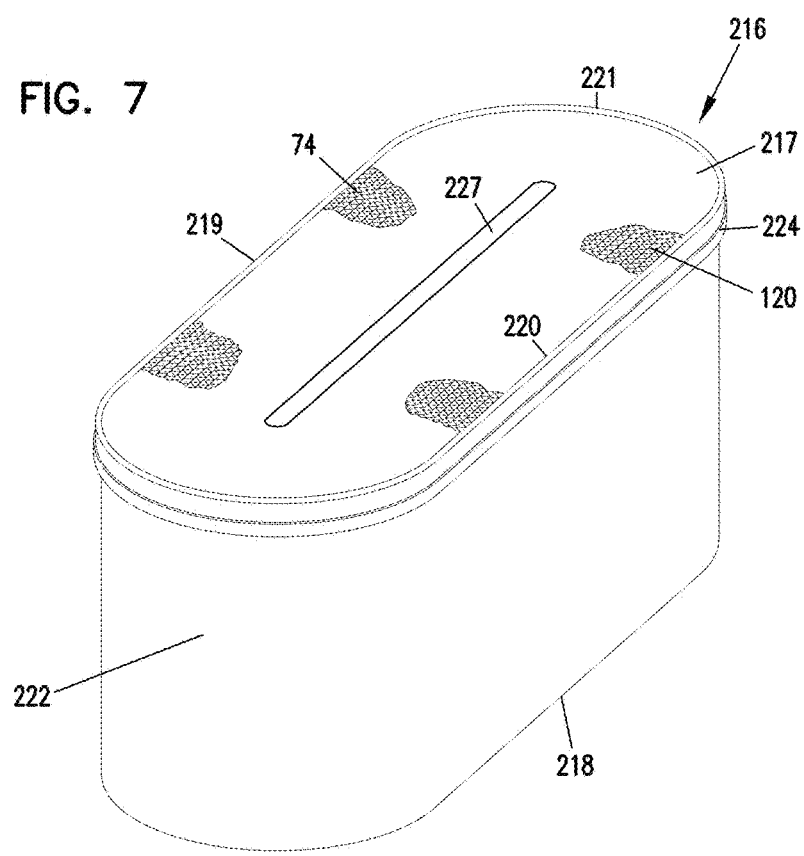
FIG. 7 is a schematic, perspective view of a second filter element utilizing fluted filter media constructed in accord with the principles described herein, and having sealed ends.

FIGS. 6 and 7 illustrate example filter elements utilizing z-media 74 having flutes 120. In FIG. 6, the z-media 74 with the flutes 120 is wound into filter element 202. The filter element 202 includes opposite flow faces 203, 204 that, in this instance, are parallel. In alternate configurations, one of the flow faces 203 or 204 may not be flat or lie in a single plane, e.g., it may be conical. An example of a conically shaped filter element with z-media is shown in U.S. Des. 399,944; U.S. Des. 428,128; and U.S. Des. 396,098 and z-media with folded flutes can be configured analogously. The flow face 203 is shown schematically, with only portions showing end flutes 205, but it should be understood that the entire filter face 203 will typically have end flutes 205. In use, fluid to be filtered enters the upstream flow face (in this instance face 204) and exits downstream flow face, in this instance, face 203). The fluid generally flows in the same direction entering the upstream flow face 204 as it exits the downstream flow face 203. Again, this configuration generally referred to herein as a "straight through flow" filter.

As can be seen in FIG. 6, the particular filter element 202 is round, in that it has a circular cross-section. When using the filter element 202 in an air cleaner system, the filter element 202 may be modified by placing an appropriate gasket or other type of sealing members thereon. One example housing seal or sealing gasket 208 is shown secured to an outer cylindrical surface 209 of the element 202. The sealing gasket 208 shown includes foamed polyurethane and forms a seal with a housing by compression of the gasket 208 against the housing. Examples of usable sealing gaskets include the ones described in U.S. Pat. No. 6,190,432 and U.S. patent application Ser. No. 09/875,844, filed Jun. 6, 2001, and commonly assigned hereto.

FIG. 7 illustrates another example of a filter element 216 utilizing z-media 74 and wound into the filter element 216. As with the filter element 202 shown in FIG. 26, the filter element 216 has opposite flow faces 217, 218 to accommodate straight through gas flow. As with the FIG. 26 embodiment, this embodiment also shows the flow face 217 schematically, with only portions showing end flutes, but it should be understood that the entire filter face 217 typically will show the end flutes. In this embodiment, the filter element 216 is obround. Specifically, this particular filter element 216 has a cross-section in the shape of two generally parallel sides 219, 220 joined at their ends by curved portions 221, 222. This shape is sometimes referred to herein as a "racetrack shape." The filter element 216 may include appropriate housing seals or gaskets, and in the example shown, includes the type of sealing member 224 described in U.S. Pat. No. 6,190,432. This sealing member 224 includes polyurethane mounted on (or molded) on a frame, secured to the element 216. In each of the elements 202, 216, a central core 226, 227 is shown as having the z-media 74 wound therearound.

Figure 8:
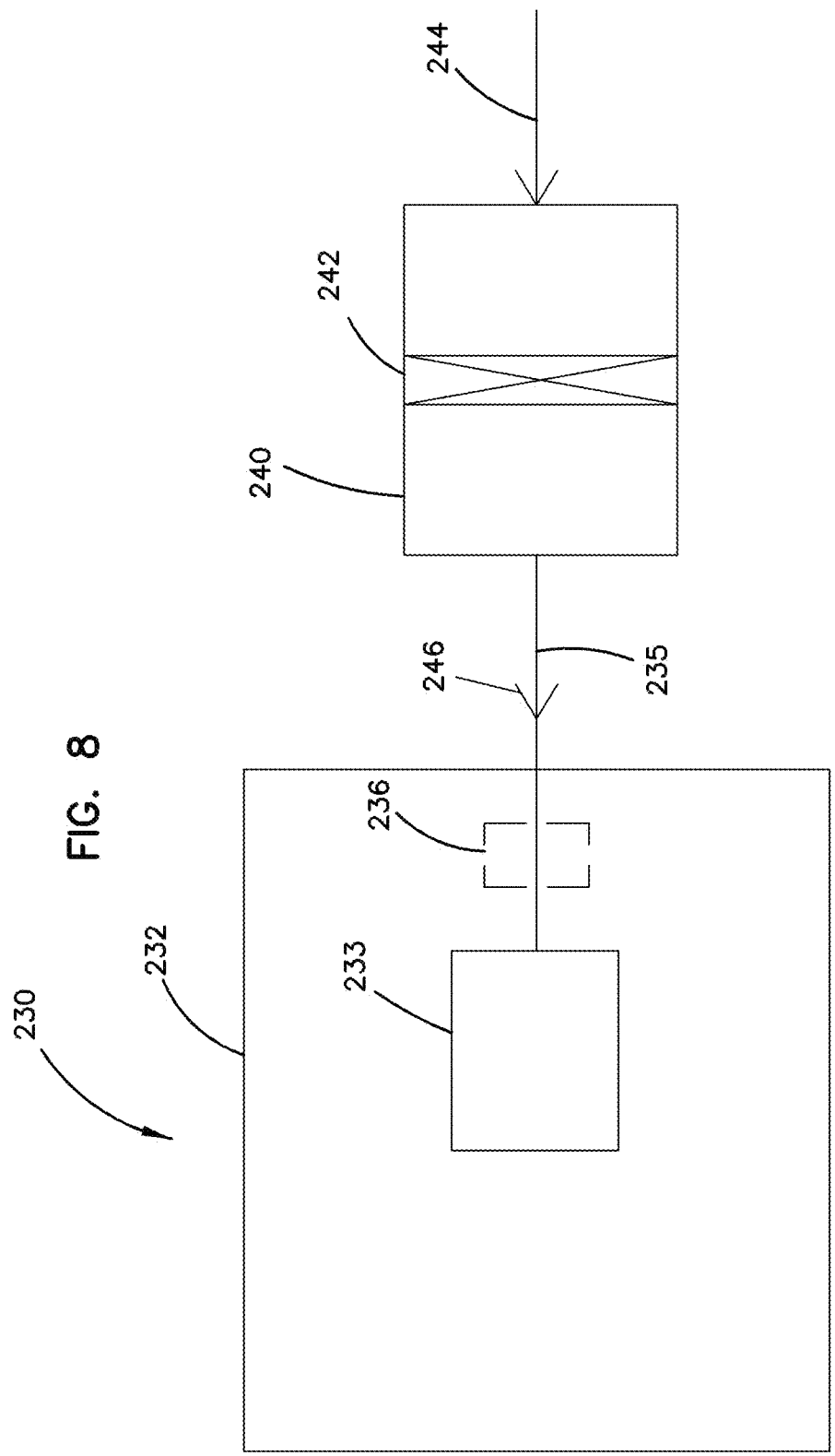
FIG. 8 is a schematic view of one embodiment of a system in which air cleaners having elements for filter media of the type described herein are used.

The filter media described herein can be made into elements, of which examples are shown in FIGS. 6 and 7. The filter elements are useable in fluid (liquid or air) cleaners. One such system, for air filtration, is depicted schematically in FIG. 8 generally at 230. In FIG. 8, equipment 232, such as a vehicle, having an engine 233, with some defined rated combustion air flow demand, for example at least 300 cfm, for example 500-1200 cfm, is shown schematically. Equipment 232 can include a bus, an over-the-highway truck, an off-road vehicle, a tractor, or marine equipment such as a powerboat. The engine 233 powers the equipment 232, through the use of an air and fuel mixture. In FIG. 8, the air flow is shown drawn into the engine 232 at an intake region 235. An optional turbo 236 is shown in phantom, as optionally boosting the air intake into the engine 233. An air cleaner 240 having a filter construction 242 is upstream of the engine 232 and the turbo 236. In general, in operation, air is drawn in at arrow 244 into the air cleaner 240 and through the primary element 242. There, particles and contaminants are removed from the air. The cleaned air flows downstream at arrow 246 into the intake 235. From there, the air flows into the engine 233 to power the equipment 232.

Other examples of useable systems include intake air filters gas turbine systems. Of course the media can also be used in liquid (for example oil (lubrication), fuel or hydraulic) filters.

Figure 19:
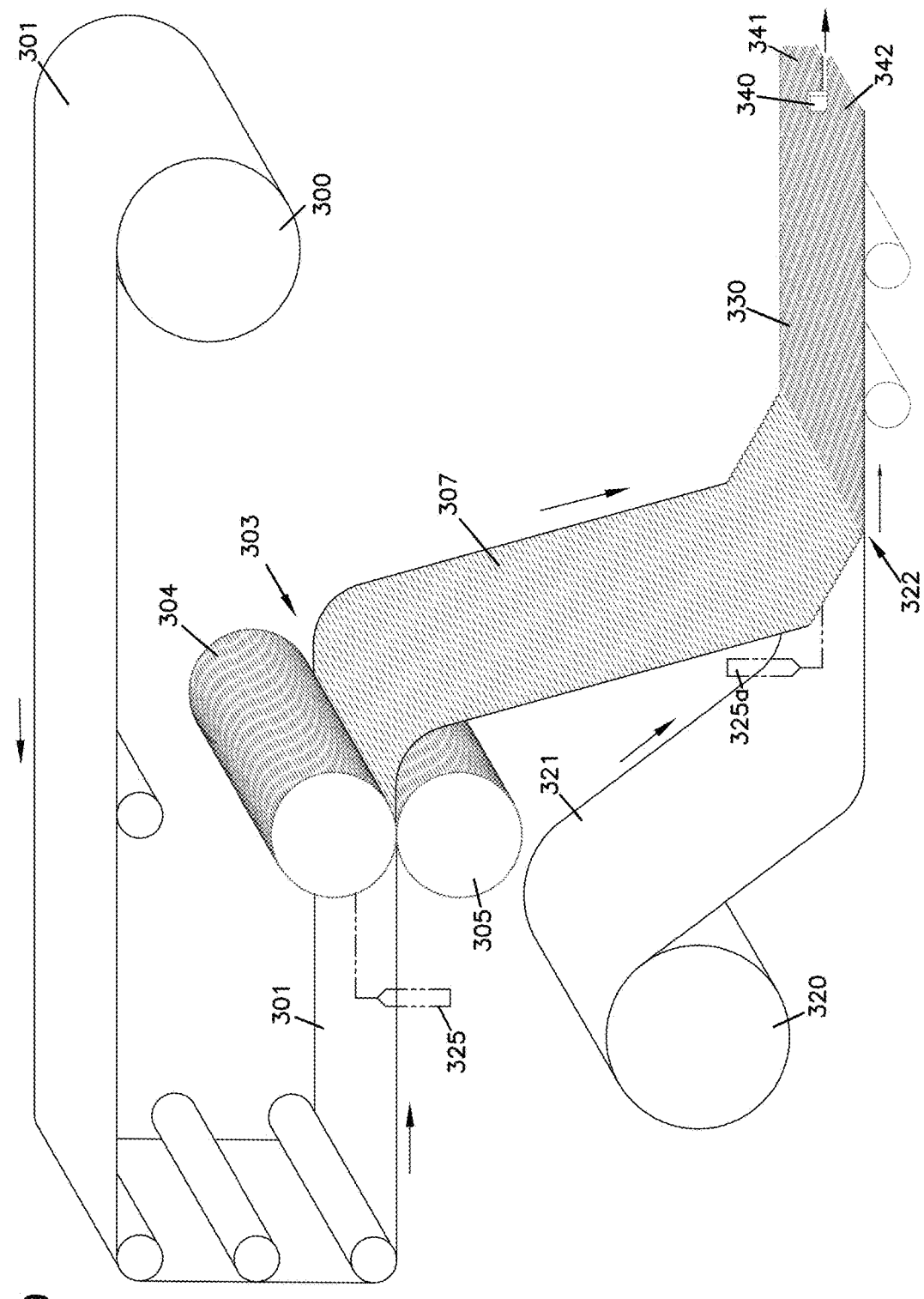
FIG. 19 is a schematic depiction of a process for forming a corrugated media-facing sheet combination, for use in forming filter cartridges according to the present disclosure.

Attention is now directed to FIG. 19, in which a process for manufacture of media usable to form arrangements is characterized herein, as shown. Referring to FIG. 19, at 300, roll stock of media 301 usable to form corrugated media shown. A continuous web of media 301 is shown directed into a bite 303 between corrugation roller 304 and 305. Exiting from the corrugation bite 303 is shown a resulting continuous corrugated web 307.

Still referring to FIG. 19, a second roller 320 of media 321 is shown. The media 321 is a continuous web directed into location 322, whereat it is supplied as a facing sheet to a side of corrugated sheet 307. Media 321 is preferably a non-fluted, non-corrugated media.

In general, sealant is applied between the corrugated media 307 and the facing sheet 321, to form seals at one edge of a resulting filter media combination. Two (convenient) optional locations for application of the sealant shown. At 325 one preferred location is provided, in which the sealant is applied to sheet 301 before corrugation, to a side which will face sheet 321 when they are joined. When applied at this location, preferably in bite 303 a gap is provided, to accommodate the sealant bead. An alternate optional location is shown at 325a, in which the sealant is applied to a side of web 321 which will be facing corrugated sheet 307, when they are joined.

In either case (325, 325a) for the process shown, the sealant or sealant strip is applied mid-web, although alternatives, discussed below, are possible. After the corrugated web 307 and facing sheet 321 are joined to form a corrugated/facing sheet combination 330, the combination is directed to a slitter 340, which will slit the combined web into two strips 341, 342. The slitter 340 uses a knife edge preferably organized to split the combination directly through the seal bead, so that each resulting strip 341, 342 will be completely sealed along one edge between the corrugated sheet and the facing sheet. Such a process will sometimes be characterized as a mid-web sealant process, and it makes two strips of media at once.

In an alternate process, the sealant or sealant strip would be applied along an edge, between two media webs 301, 321, to form one strip of media.

The preferred sealant is a urethane, as described herein, if the corrugation is not folded. In prior art processes, a hot melt was typically used.

In some applications, a mid-web fold process in accord with PCT PCT/US03/02799 and U.S. provisional 60/395,009 can be used, before slitting. In such instances, a hot melt adhesive may be preferred in the folded flute end.

The next step depends upon the type of structure to be made. In some instances the resulting corrugated sheet/facing sheet strip is cut into sections, which are stacked on one another with sealant bead appropriately therebetween, to provide sealing at the opposite end of the media. In an alternate process, a selected corrugated sheet/facing sheet strip is coiled to form a coiled media construction. Such coiling is generally done with the facing sheet to the outside of the coil, and the corrugated sheet to the inside. Sealant is shown applied to the corrugated sheet at an opposite edge from the edge at which sealant is between the corrugated sheet and the facing sheet. This sealant strip, during the coiling, will become positioned between the corrugated sheet and the back side of the facing sheet, as the coiling around occurs. By "backside" of the facing sheet in this context, is meant a side of the facing sheet that is directed away from the corrugated sheet before coiling. (The opposite side will be called the front side.) Similarly, the "backside" of the corrugated sheet will be referred to as the side directed away from the facing sheet, before coiling. (The opposite side will be called the front side.)

The back side sealant applied before or during coiling, is preferably urethane in accord with the present disclosure. In the prior art, hot melt was typically used.

II. Processing Advantages and Options With Urethane Sealant

The use of a slower curing sealant such as a urethane sealant in place of hot melt, provides for the possibility of number of advantages. Unlike hot melt, the preferred sealant is provided in a form that will foam as it cures. As the sealant material foams during cure, it expands in size. This reduces the likelihood of leak formation. Further, a sealant material that is slower to cure, than the time in which hot melt hardens from cooling, is advantageous. For example, some shape manipulation of the media, to advantage, can occur after sealant is applied and while the sealant is still in a curing stage, without leak formation, if a sealant like urethane sealant is used instead of hot melt. The flexibility afforded by this, can be used to generate certain types of constructions to advantage, as described. Also, urethane sealant, specifically, can be advantageous relative to hot melt, because urethane maintains its integrity in higher temperature conditions, than typical hot melt. For example, hot melt can soften enough to distort after extended exposure (about 2 hrs) to temperatures of about 180° F.

Figure 9:
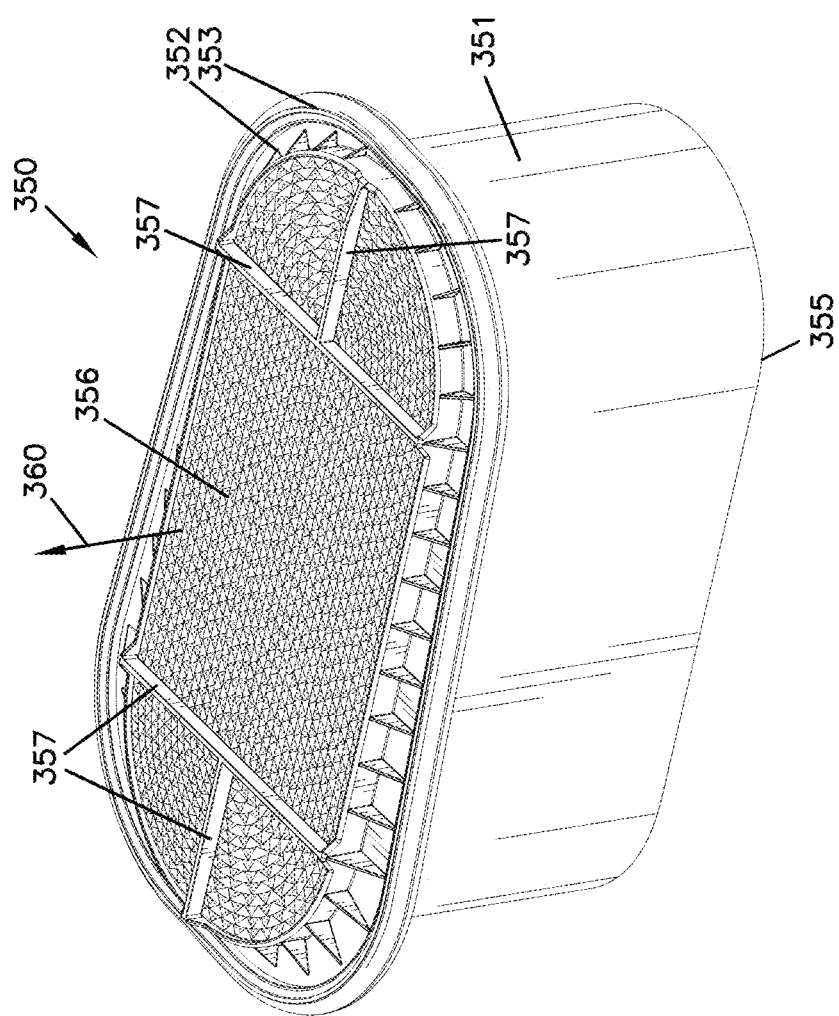
FIG. 9 is a schematic, perspective view of a filter element utilizing wound fluted filter media having flutes sealed closed in accord with the descriptions herein, shown having been made without a center board and include a framework mounted thereon.
Figure 10:
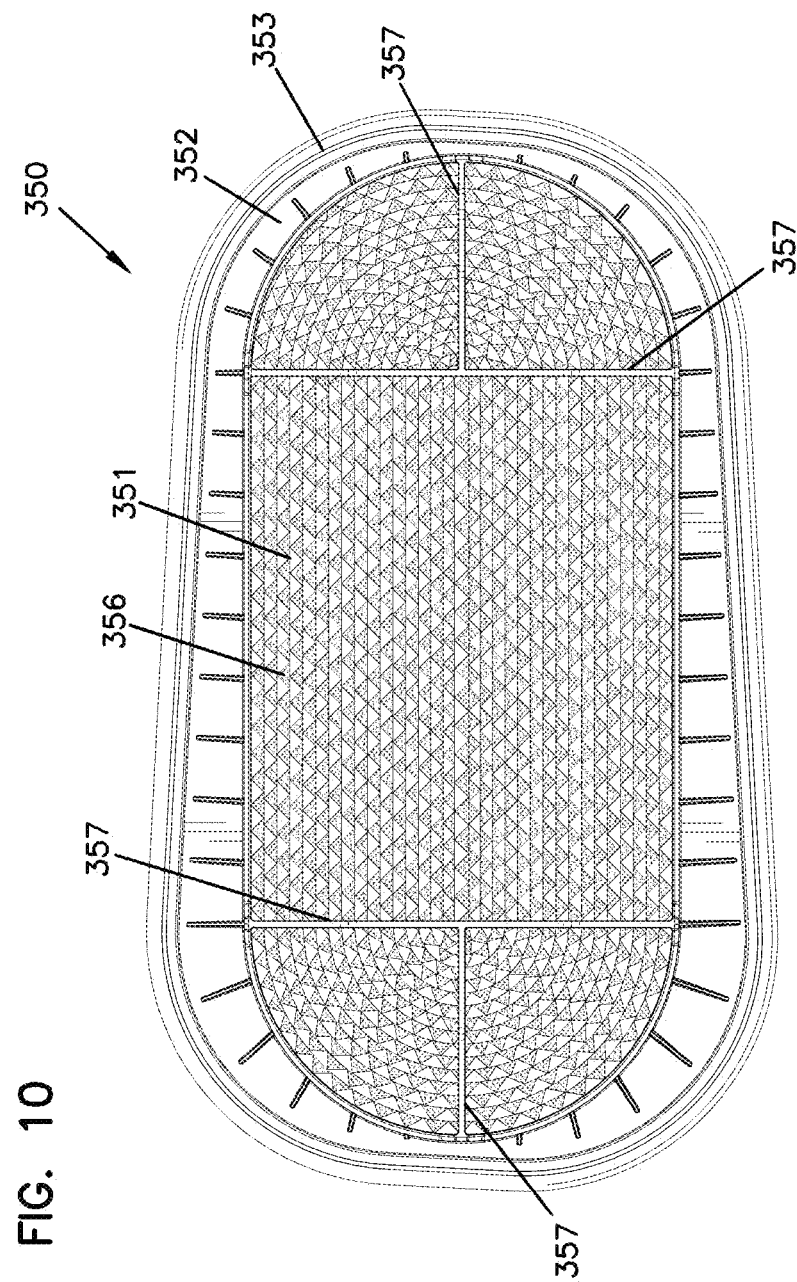
FIG. 10 is a top plan view of the filter element of FIG. 50.

Examples of a preferred filter cartridge construction manufacturable utilizing a preferred process according to the present disclosure, are provided in FIGS. 9 and 10. Referring to FIG. 9, the filter cartridge 350 depicted generally comprises a coiled z-filter media construction 351 having framework 352 mounted thereon. The framework 352 includes a housing seal or seal ring 353 thereon. A typical housing seal 353 will be formed from a urethane or other material. The framework 352 is sized to engage portions of a housing, not shown, in a sealing manner to seal filter media construction 351 in place. In typical operation, air flow would enter upstream face 355 and exit downstream face 356. Typically, framework 352 (except for seal 353) is a rigid molded plastic, but metal constructions can be used. Again, the term "housing seal" and variants thereof, is meant to refer to a seal mounted on the filter cartridge construction, for providing a seal between the cartridge construction and a housing, in use.

Cross pieces 357 of framework 352 generally provide strength to framework construction 352. In some prior art applications with hot melt, such cross pieces also were used as a face lattice to inhibit telescoping of the media construction 351 in the direction of arrow 360; i.e., in the direction of air flow. However, in general, when a urethane sealant material as described herein is used, telescoping effects are minimal. This is an advantage relative to the use of hot melt, which, as it softens under conditions of heat, can permit some distortion or telescoping of the associated media construction (in the absence of framework to inhibit the telescoping). Thus, in some arrangements improved media as characterized herein can be used without an outer impermeable sheath and also without added framework or with added framework that does not have cross-pieces that prevent telescoping.

Attention is now directed to FIG. 10, which is a top plan view of FIG. 9. Referring to FIG. 10, it is noted that the media construction 351 does not include an added center piece around which the media is wound. This is because the filter construction 350 was constructed in accord with a preferred process enabled by the utilization of a urethane sealant material, as described. This preferred process will be described by reference to FIG. 11. (The term "added center piece" and variants thereof, in this context, is meant to refer to a board, core, or other piece separate from the media strip.)

Figure 11:
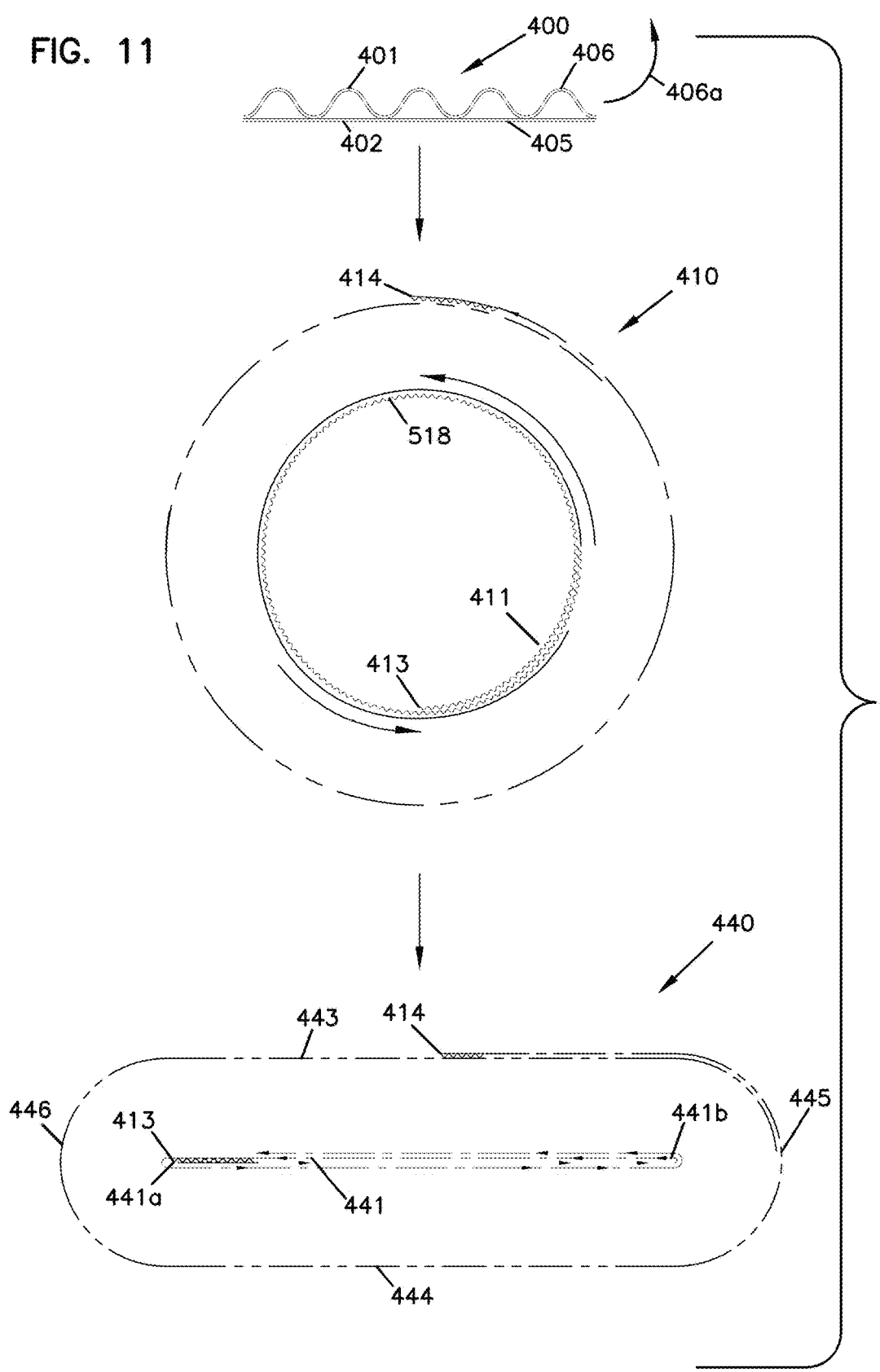
FIG. 11 is a schematic view of a process of forming the filter media component of the filter element depicted in FIGS. 9 and 10.

Referring to FIG. 11, at 400, a strip of fluted (specifically corrugated) media 401 secured to a facing sheet 402 is shown. Along one side edge, the two would be sealed together by a front side, preferably urethane, seal bead. (The combination could have been made utilizing a process analogous to that described above for FIG. 19.) In a first step of using the fluted sheet-facing sheet combination, a back side sealant bead is applied either: (1) to surface 405 of the fluted (in this instance corrugated) sheet 401, on a back side or opposite side from facing sheet 402, and along an edge opposite to that along which the front side sealant bead is positioned between sheets 401 and 402 to seal them to one another; or, (2) to a back side 406 of the fluted (in this instance corrugated) sheet 401, again along an edge opposite to the front side seal. The combination 400 with the backside sealant bead is coiled, in the direction of arrow 406, with the flutes (or corrugations) directed to the inside of the coil and with the facing sheet 402 directed to the outside of the coil to form to form a first coil or configuration. At 410, such a coil is shown, schematically. The particular coil 410 shown is generally circular, around a central open space 411, however alternate shapes are possible. The coiling could have been around a mandrel which is removed to provide for the open space 411. The circumference of the open space 411 will be selected, as discussed below. A lead or front end of the media strip 400 directed into the coiling, is shown at 413. An opposite rear or tail end is shown at 414. A typical coil, for many air filter applications, would have an outside perimeter of at least 30 cm., often at least 60 cm., for example 70-160 cm. Typically it will be made by winding the media at least 6 times around, typically at least 10 times.

The net result of the coiling, whether around a hub or mandrel (which is later removed) or around an open space, is to provide a construction such as that shown at 410, which is coiled with a central opening 411. (That is, the open space is distorted in shape.) Such a construction can then be distorted from its original shape, to a second shape. The second configuration or shape would typically, for many air filter applications, have an outside perimeter of at least 30 cm., often at least 60 cm. An example of a second shape is an obround shape as shown at 440. In a later step, a framework such as framework 352, FIG. 9, can be added, if desired.

In general, the length of a center strip 441 in construction 440 between ends 441*a*, 441*b* will be about one-half of the circumference of opening or open space 411. Thus, the circumference of opening 411 should be selected to provide the preferred size of strip 441, for a selected application.

The particular, preferred, construction 440 depicted is sometimes referred to herein as having a racetrack shape, with the typical features being: two opposite, generally parallel, straight sides 443, 444; and, opposite, rounded, ends indicated at 445, 446, generally each being approximately semi-circular. The opposite sides 443, 444, do not need to be precisely parallel or perfectly straight.

Distortion of a first, coil or, wound arrangement, such as structure 410, to a second, arrangement, for example to an obround arrangement such as 440, is facilitated when urethane is used for the backside sealant bead in the winding operation. This is in part because urethane is relatively flexible, by comparison to hot melt. In addition, because the urethane is relatively slow to fully cure, the distortion can be made to occur before the urethane material of at least the back side bead is fully set. It is also facilitated by utilizing a sealant material that foams, since it expands as it cures, and will tend to fill spaces and inhibit leaks.

When a strip of corrugated media secured to a facing sheet is coiled, two ends are defined. The first end, characterized herein as the lead end, forms an inner most end inside of the coil 410. In FIG. 11, the lead edge is indicated generally at 413. The second end, generally referred to herein as the "tail end," is the end of the strip left against the outside of the media coil 410. In FIG. 11, the tail end is indicated at 414.

A preferred process approach for coiling media is described in Section V below, in connection with the description of FIG. 21. Such a process can be applied, as a specific form of the process described in FIG. 11, to provide preferred media constructions according to the present description. It can also be applied with alternate z-filter configurations, and even z-filter configurations utilizing alternate seal material, if desired.

Figure 12:
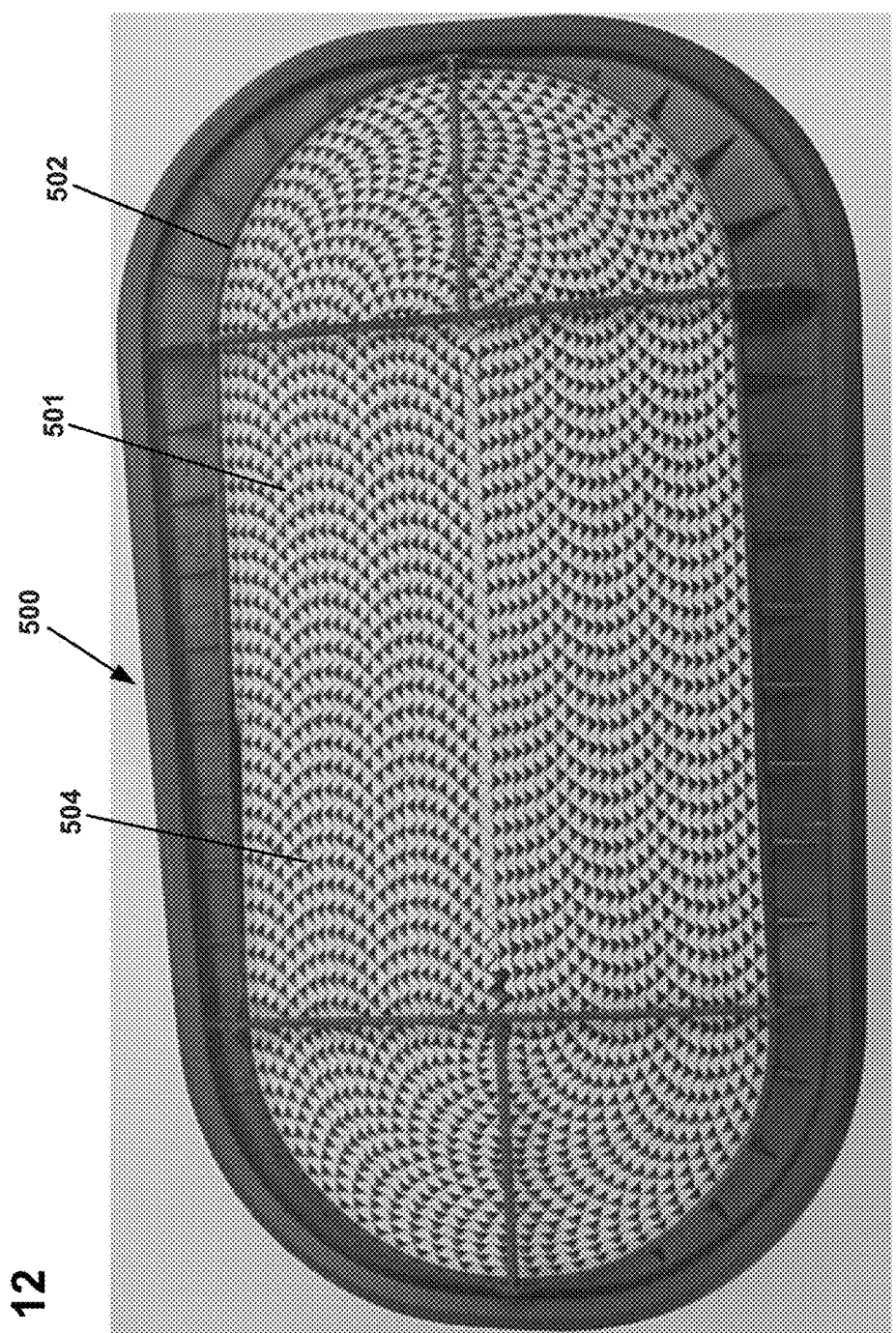
FIG. 12 is a top plan view of a filter element analogous to FIG. 10.

Attention is now directed to FIGS. 12-18. In FIG. 12, a top plan view of a filter element 500 generally in accord with the arrangement of FIGS. 9 and 10, is depicted. Referring to FIG. 12, filter media construction 501 is viewable, having framework 502 mounted thereon. The media construction 501 is generally in a racetrack shape, as described above. The media construction 501 includes no added center piece around which the media is coiled.

The media construction 501 generally comprises a coiled strip 504 of corrugated media secured to facing sheet, made in accord with the process of FIG. 11.

Figure 13:
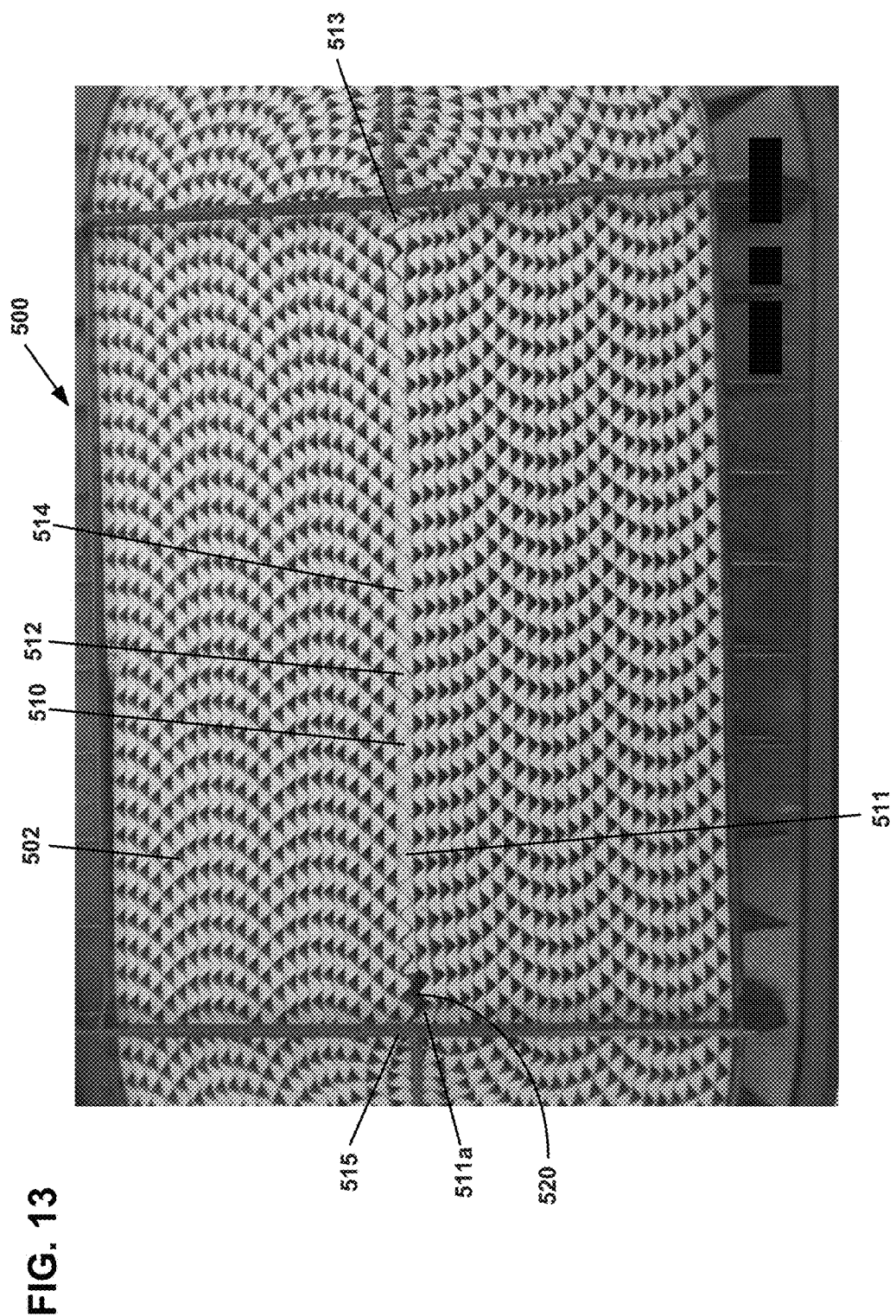
FIG. 13 is an enlarged fragmentary view of a portion of FIG. 12.

In FIG. 13, an enlarged fragmentary view of the filter element 500 is depicted. In FIG. 13, a media center strip 510, around which a remainder of the strip 502 is coiled, is readily viewable. The media center 510 is easily viewed to be without a center board or piece around which the media is coiled. That is, the media 502 is simply coiled around itself. A first, substantially straight, lead strip 511 is readily viewable, extending from lead end 511*a* along strip 512 to first bend 513. The media 502 then extends along second, substantially straight, strip 514 until a second turn 515 is encountered. This results in one complete turn or coil, with further turns, or progressively outside coils, following. Sections 512 and 514 generally result from an innermost turn 518 of coil 410, FIG. 11, after compression or distortion to the racetrack shape.

Referring to FIG. 13, it is noted that the coiling was conducted with the corrugated sheet toward the inside and the facing sheet directed outside. Also, in sections of strips 512 and 514, the flutes (in the preferred instance shown, the corrugations) are interdigitated. The term "interdigitated" in this context, is meant to refer to the fact that in at least portions of strip 512, selected ones of flutes or corrugations in the strip 512 are each directed into troughs between selected ones of flutes or corrugations of strip 514; and, along at least portions of strip 514, selected ones of flutes or corrugations are directed into troughs between selected ones of flutes or corrugations of strip 512.

Herein, when two strips are said to be interdigitated over an extension of at least N flutes or corrugations, it is meant that at least N sequential flutes or corrugations of one strip are interdigitated between adjacent ones of N+1 sequential flutes or corrugations of another strip. For example in FIG. 13, the two strips 512, 514 are interdigitated over an extension of at least 15 corrugations, so at least 15 sequential individual corrugations of strip 512 are each positioned between adjacent ones of 16 sequential, individual, corrugations of strip 514. Generally, and preferably, for preferred arrangements, an interdigitation for one strip of at least six (6) flutes or corrugations, typically at least fifteen (15) flutes or corrugations, will be preferred. Often an interdigitation of at least 20 flutes or corrugations, as shown in FIG. 13, will be used.

The provision of interdigitated flutes or corrugations, along a center strip of a media pack deformed from a circular coil of a single strip, is advantageous for a number of reasons. For example, space savings results. Also, a more secure arrangement with respect to media movement results. In addition, some advantage to fluid flow is obtained. Of course, an added center piece has also been avoided.

A space 520, at an inner end of the coil, can be filled, for example adjacent one flow face of the media construction, with sealant to prevent unfiltered flow through the construction. A foamed sealant, such as a foamed polyurethane, will be preferred.

It is noted that in FIG. 13, the tail end of the media can be seen at 525, located adjacent one of the straight sides.

Figure 14:
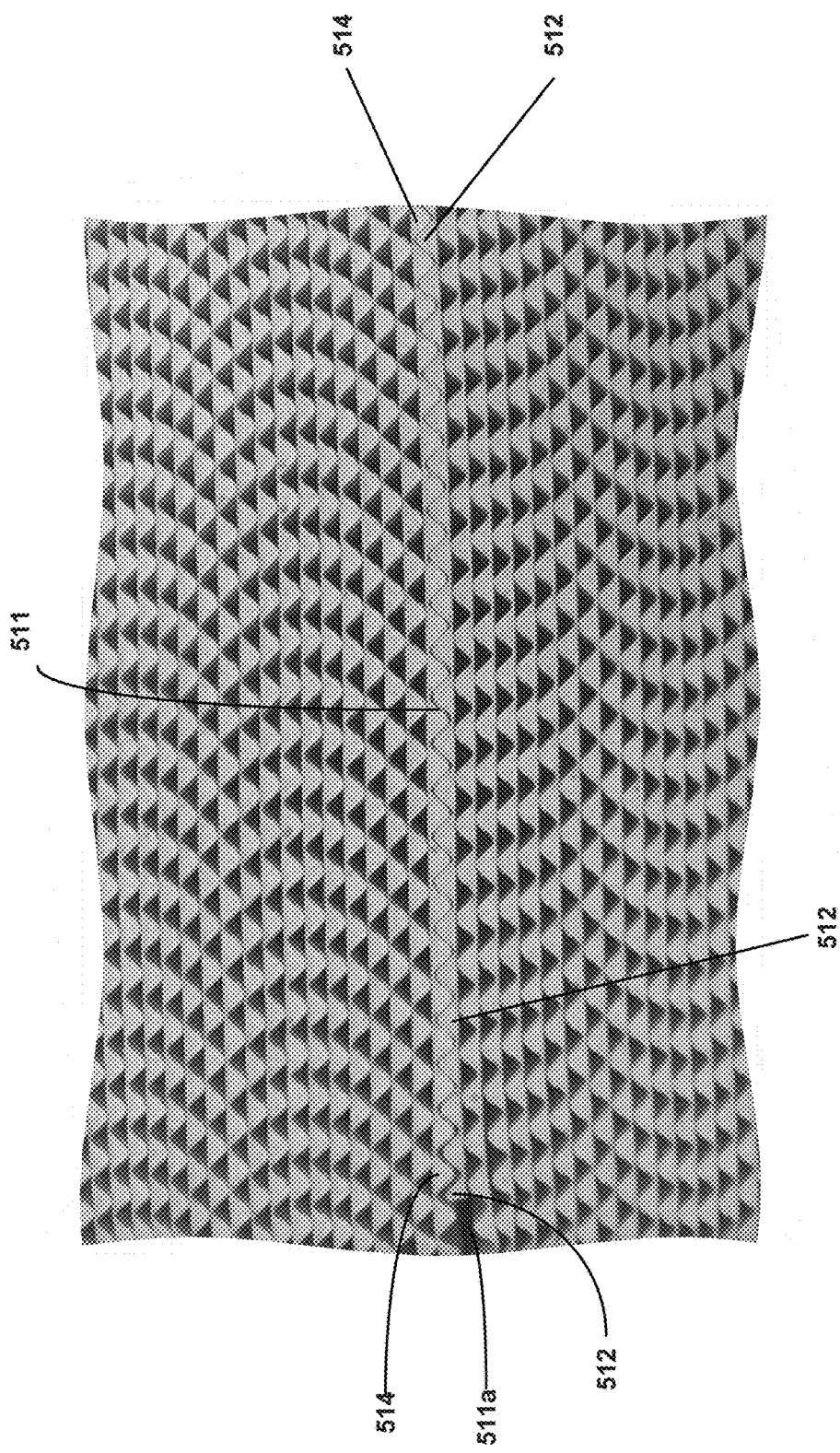
FIG. 14 is an enlarged fragmentary view of a portion of FIG. 13.

Attention is now directed to FIG. 14, which is an enlarged fragmentary view of a portion of FIG. 13. Here, center strips 512, 514 having interdigitated segments, can be more readily seen. Of course strips 512, 514 are sections of a single coiled strip media material comprising a corrugated sheet-facing sheet combination.

Figure 15:
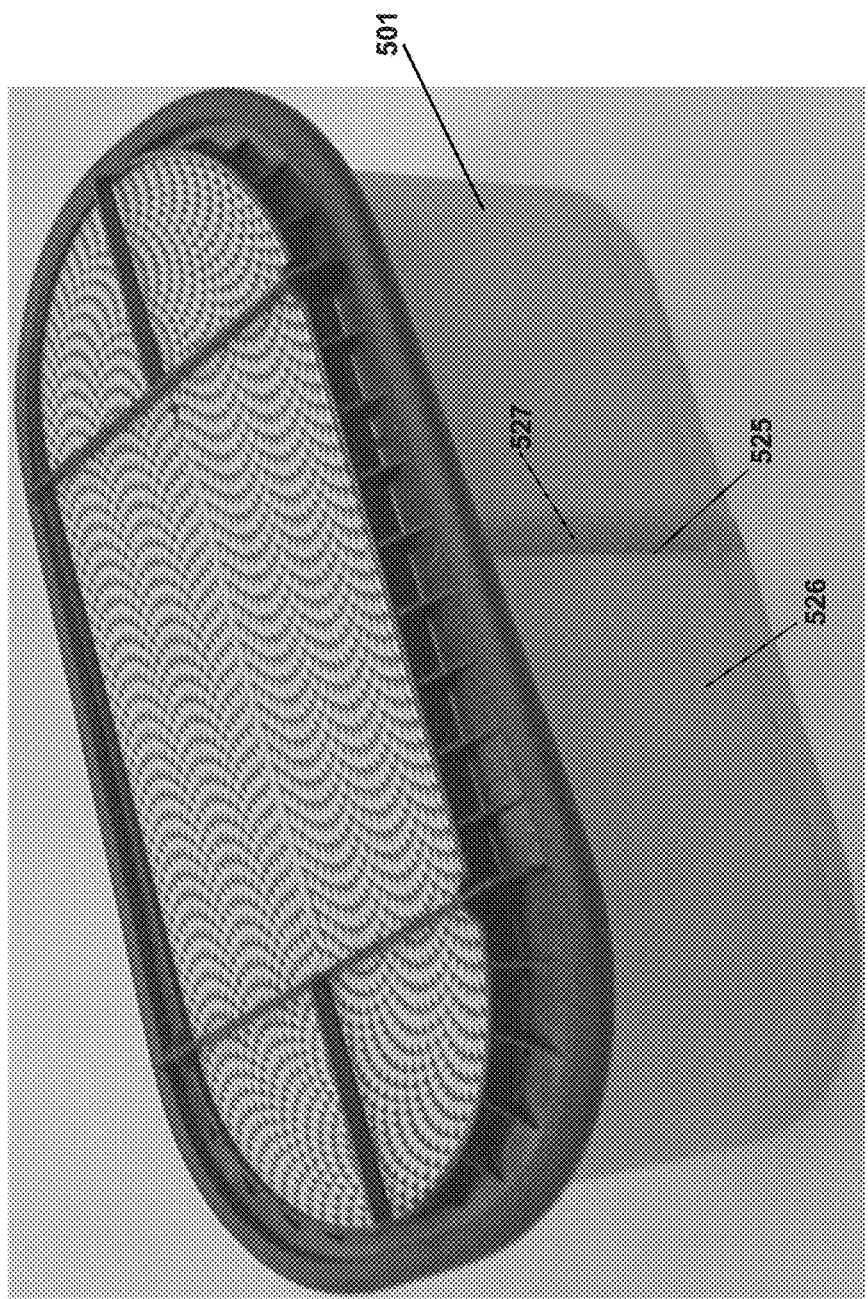
FIG. 15 is a perspective view of a filter element depicted in FIG. 11.
Figure 16:
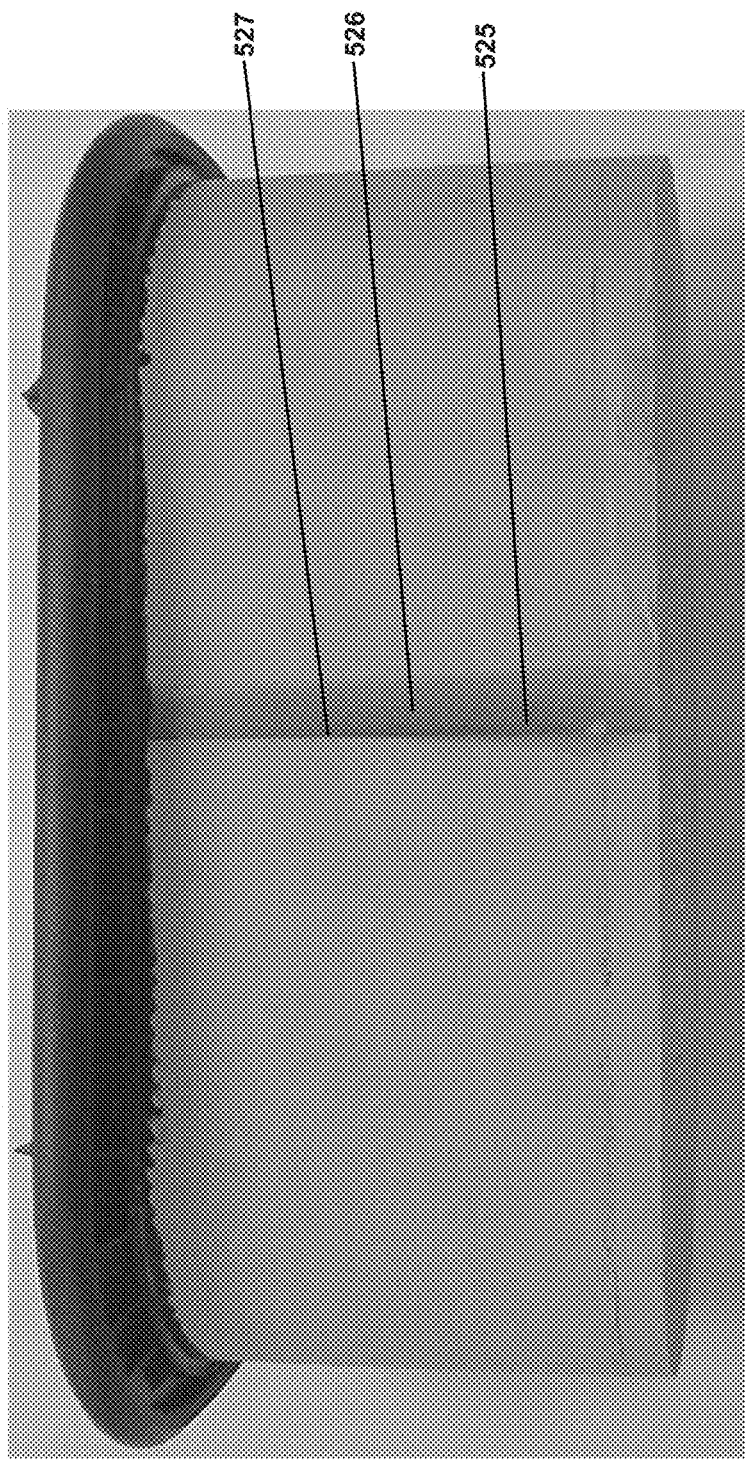
FIG. 16 is a side elevational view of the filter element depicted in FIG. 15.

Attention is now directed to FIG. 15. In FIG. 15, the tail end 525 is shown sealed (and secured against side 526)

completely along its length by a sealant 527, in this instance hot melt. In FIG. 16, sealant 527 and tail 525 are similarly viewable.

By the sealant 527 extending completely along the length of tail end 525, an undesirable level of leakage from between the corrugated sheet and the facing sheet at the tail end, is inhibited.

With respect to the lead end 511*a*, FIG. 14, in general sealing of the corrugated (or fluted) sheet to the flat sheet, completely along this end, if desired, could be conducted prior to coiling. It has been observed, however, that when the center strip 511, FIG. 14, is formed with preferred, interdigitation, leakage from between the corrugated sheet and the flat sheet at this location, can be reduced to insignificant levels, even in the absence of sealant (between the two sheets) that extends completely across the lead end.

Figure 17:
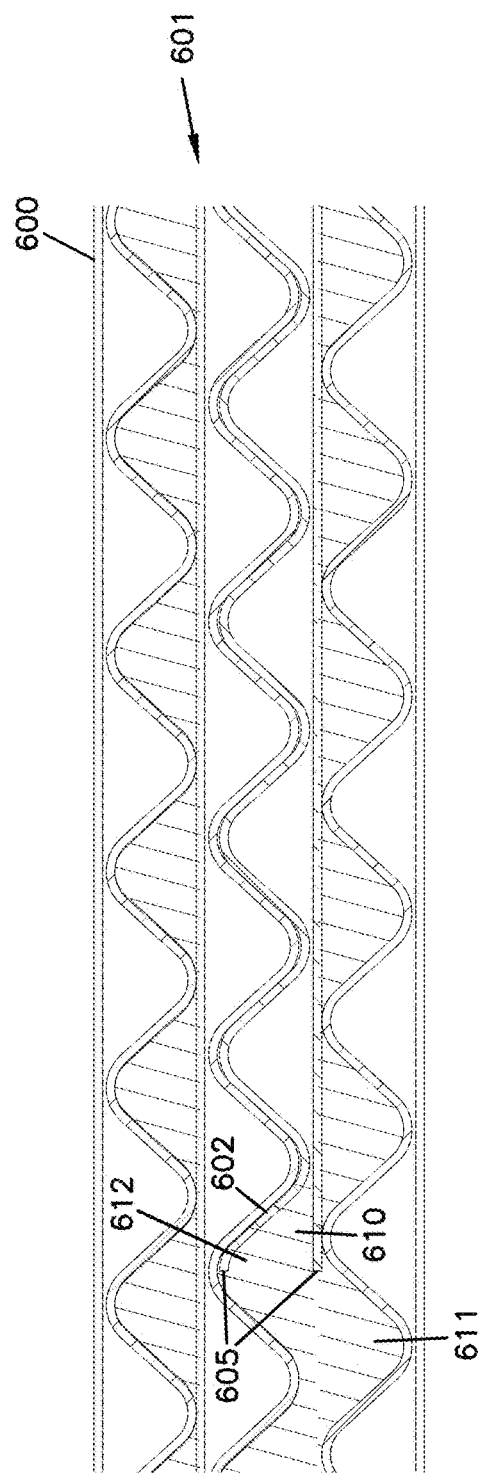
FIG. 17 is a fragmentary schematic cross-sectional view depicting a portion of the element of FIGS. 12-16.

Attention is now directed to FIG. 17. FIG. 17 is an enlarged schematic view depicting the center strip of a media coil, in this instance the view is toward the inlet end or dirty side of the media construction. Referring to FIG. 17, the media coil is generally indicated at 600. A center strip, with interdigitated flutes or corrugations, is indicated at 601. The lead end of the media is generally indicated at 605. Sealant along that lead end 605, immediately adjacent edge 602, was provided by sealant 610, preferably urethane sealant. Sealant at this location would have resulted from foaming and curing (with volume expansion) of sealant originally positioned in regions 611, 612, during a process as described above with respect to FIG. 11. During cure, additional sealant can be added, to fill any open space at this location, if desired. This is facilitated by using a foamed sealant such as urethane.

Figure 18:
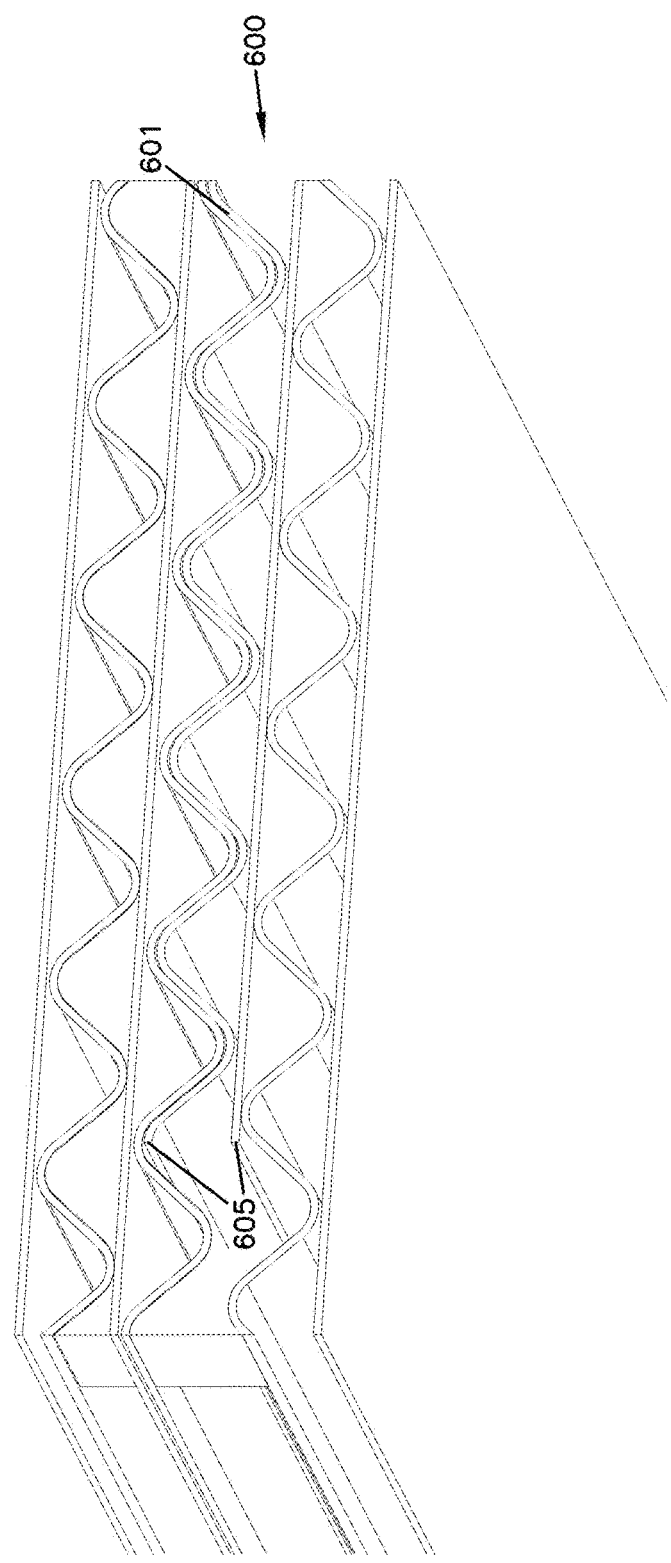
FIG. 18 is a schematic fragmentary perspective view of the media depicted in FIG. 17.

FIG. 18 is a perspective view of the media section shown in FIG. 17, with reference numerals indicating similar features.

Referring to FIG. 11, preferably the deformation of coil 410 to yield shape 440 is conducted so that the tail end 414 of the media from the coiling is along one of the straight sides 443, 444 and, not at one of the curved ends 445, 446. This is preferred since it leads to a more secure closing of the tail end 414.

III. Some General Observations and Principles

In general, the techniques previously described can be used to provide for preferred fluted filter media constructions. In this context, the term "fluted filter media construction" is meant to refer to a filter construction which includes the media, whether the construction is the media itself or the media provided in the form of an overall serviceable filter element or cartridge, through addition of a seal for sealing to a housing and/or framework.

Also according to the present disclosure, for example as described with reference to FIG. 19, processes for manufacturing a filter media construction including a sheet of fluted (typically corrugated) filter media having curved wave pattern of corrugations are provided. Preferably the processes are conducted on a sheet of corrugated media having a curved wave pattern of corrugations secured to a non-fluted facing sheet.

The process may be conducted to form strips in a mid-web sealing process, with follow-up slitting. It also may be conducted to form a strip provided with sealing along a web edge (not made by a mid-web sealing process). The process may involve flute folding, in accord with PCT/US03/02799 and/or U.S. provisional 60/395,009.

In a typical such process, the corrugated sheet or web would be formed by passing a non-corrugated sheet into the bite between corrugation rollers. In some processes sealant may be provided on the corrugated sheet prior to deformation, by providing the sealant on the web when it is passed into the corrugating rollers, to form the corrugated sheet. This can be advantageous for reasons previously discussed.

Also according to the disclosure a method for preparing of fluid filter media construction is provided. The method, is generally characterized with respect to the description of FIG. 11, includes a first step of coiling a media strip comprising a fluted sheet secured to a non-fluted sheet, into a first coiled configuration. The first coiled configuration would typically be circular, although alternatives are possible. The coiling could be around a mandrel which is later removed, or around an open space. In general the coiled media strip would include a front side sealant strip between the fluted sheet and facing sheet, along a first side edge; and, there would also be provided a back side sealant strip between the fluted sheet and the facing sheet along a second side edge.

After the step of coiling, and in the absence of added center piece, the first coiled configuration would be deformed into a second coiled configuration. A typical second coiled configuration would be a race track shape or similar shape, having interdigitated corrugations or flutes, along an inside strip.

In a preferred process, the back side sealant strip is polyurethane, more preferably polyurethane which foams during cure to provide a foamed polyurethane. Preferably the material is selected to provide at least six interdigitated flutes, more preferably at least 15 interdigitated flutes and most preferably at least 20 interdigitated flutes along the inner strip. Preferably the inner strip is at least 6 cm. long, more preferably at least 12 cm. long.

The front side sealant strip may be polyurethane (preferably foamed polyurethane). However, if the corrugated sheet-facing sheet is made with one set of flute ends folded closed between the corrugated and facing sheets, along the front side seal typically a hot melt would be used.

Preferably the process is conducted with corrugated media, secured to non-corrugated media, preferably with a flute/flat ratio within the range of 1.2-2.0, more preferably 1.25-1.35.

Preferably the deformation is conducted such that a tail end of the media strip, of the first coil, is positioned along a straight portion of the second coiled configuration. It is preferably sealed against a straight side section of the second coiled configuration, using a sealant, for example hot melt.

In typical applications, the step of coiling to form the first coil configuration will be conducted to provide a configuration having an outside perimeter of at least 30 cm., typically at least 60 cm., for example 70 to 160 cm.

In a typical process, a follow-up step of adding a framework to help maintain the media in the preferred second coiled configuration, as well as to support a housing seal, can be provided. However, alternate configurations, for example in which a seal is directly applied to the media coil as opposed to using any added framework, are possible. In this latter approach, added framework, to provide cross-pieces or lattice across either flow face, can be avoided.

In general, the principles herein relate to a preferred filter media construction including coiled media strip comprising a fluted sheet secured to a non-fluted sheet is provided. The preferred construction is one having no added center piece and including a strip having at least six interdigitated corrugations. However, alternate preferred constructions, involving the preferred choice of a urethane, in particular a foamed urethane, for the sealant to close ends of the flutes are possible. Preferably a race track shape configuration is provided, with two opposite generally straight parallel sides, and two curved ends. Preferably a perimeter size of at least 30 cm., preferably at least 60 cm., and typically 70 to 160 cm., will be chosen.

IV. Urethane Sealant Use

In general, in prior art z-filter systems hot melt adhesives were used, to seal the ends of flutes. According to the present disclosure preferred processes are conducted, to prepare preferred materials, which utilize urethane as the sealant.

Typically, two sealant beads are involved in the creation of z-filter elements. The first is the seal bead positioned between the corrugated media and the facing or non-corrugated sheet, as the two sheet media composite is constructed, as described herein. The sealant bead can be applied either to the facing or flat sheet, or it can be applied to the material which will be corrugated to form the corrugating sheet, before corrugation occurs, as described herein above. In some applications a urethane sealant (preferably one that foams during cure) can be used at this location, to advantage. In others, a hot melt can be used, especially if media folding of these flutes is involved.

The second sealant location is sometimes referred to as the winder bead, and is the sealant bead that forms the seal at the opposite side of the corrugation sheet, from the sealant bead between the corrugated sheet and the facing sheet to which it is secured. This sealant bead is sometimes called the winder bead because it is often applied to the corrugating sheet as the winding process occurs. Herein, it will also be called the back side sealant bead. Urethane (most preferably one that foams during cure) is preferred for this sealant.

The urethane will typically be in the form of two component urethane. In general, a two component urethane is one which cures upon mixture of two components together, typically with an appropriate catalyst present. An example would be a urethane made from a resin mixed with a isocyanate composition, as described below. A variety of specific urethane formulations can be used, the example is to indicate a typical useable material. Specific choice will be based on such factors as cost, availability and handling properties.

In general, a two component urethane as characterized herein below, is a foamed urethane that expands as it cures. Indeed, preferably the urethane is chosen so that it will expand in volume at least 40%, typically 50% to 100%. An advantage to this relative to a hot melt, is that the expanding urethane will push its way into open spaces in media material at the sealant location, and help form a more secure seal.

Secondly, the urethane is self reactive and takes some period of time to cure. As a result, the media material can still be handled and manipulated after the urethane has been placed on the media material, without as great a risk of opening leaks or seal failures as with a hot melt. For example, self foaming urethane can be applied as a sealant in a winding bead, and the media can then still be manipulated from a circular wind into another shape, as the urethane cures.

Urethane is more capable of withstanding higher temperature conditions, than are typical hot melts. Thus it can be advantageous depending on the environment of use of the z-filter media involved.

A typical preferred urethane would be a blown urethane that cures to a foam urethane having an "as molded" density of no greater than 28 lbs. per cubic foot, preferably no more than 22 lbs. per cubic foot, typically no greater than 18 lbs. per cubic foot. The particular foamed urethane chosen density will depend upon the specific level of seal integrity required. It is expected that the "as molded density" will typically be within the range of 8 lbs. per cubic foot-17 lbs. per cubic foot.

Herein the term "as molded density" is meant to refer to its normal definition of weight divided by volume. A water displacement test or similar test can be utilized to determine volume of a sample of the molded urethane foam. It is not necessarily applying the volume test, to pursue water absorption into the pores of the porous material and to displace the air in the pores. Thus, the water volume displacement test used, to determine sample volume, would be an immediate displacement, without waiting for a long period of displaced air within the material pores. Alternately stated, only the volume presented by the outer perimeter of the sample need be used for the as molded calculation.

Urethane resin systems usable to provide materials having physical properties within the as molded density definition provided above, can be readily obtained from a variety of polyurethane resin formulators, including such suppliers as BASF Corp., Wyandot, Mich. 48192.

One example usable material includes the following polyurethane, processed to an end product having an "as molded" density as described. The polyurethane comprises a material made with I36070R resin and I3050U isocyanate, which are sold exclusively to the assignee Donaldson by BASF Corporation, Wyandotte, Mich. 48192.

The materials would typically be mixed in a mix ratio of 100 parts I36070R resin to 45.5 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70-95° F.

The resin material I36070R has the following description:
(a) Average molecular weight
1) Base polyether polyol=500-15,000
2) Diols=0-10,000
3) Triols=500-15,000
(b) Average functionality
1) total system=1.5-3.2
(c) Hydroxyl number
1) total systems=100-300
(d) Catalysts
1) amine=Air Products 0.1-3.0 PPH
(e) Surfactants
1) total system=0.1-2.0 PPH
(f) Water
1) total system=0.2-0.5%
(g) Pigments/dyes (optional)
1) total system=1-5% carbon black
(h) Blowing agent
1) water.

The I3050U isocyanate description is as follows:
(a) NCO content—22.4-23.4 wt %
(b) Viscosity, cps at 25° C.=600-800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The urethane usable as the sealant material to close flutes in the z-filter media can be the same as the sealant material utilized to provide seal gaskets for engagement between the filter element and an associated air cleaner.

It is noted that the preferred formulation characterized above indicates the optional presence of a pigment or dye in the urethane. The urethane can be used in its natural, uncolored, state. As an alternative to black, it can be provided with colored dyes.

For typical use in sealant beads, whether it is the front side bead between the corrugated media and the facing sheet when the combination of the two is first formed, or when used as a winding bead when the combination is coiled into a media construction, the application amount of the sealant will be typically within the range of about 4-8 grams per meter on the media. However, amounts outside of this range can be used in some instances, depending on the particular media size and shape, as well as the particular urethane density.

Typically the urethane would be mixed and then dispensed at about room temperature or about 70° up to about 95° F. The media to which the urethane is applied may be heated, depending upon other processing steps. However, there is no requirement that the media had been heated above room temperature, for typical urethane applications.

The sealant will typically be applied in a bead having a width on the order of about ¼ inch-1 inch, typically ½ inch-¾ inch. When the bead is being applied as part of the mid-web approach, to create a seal between a facing sheet and a corrugating sheet which is then to be slit to create two webs, typically a sealant bead having a width on the order of the wider end of the range will be preferred. On the other hand, when applied merely at an edge of media, either as a winding bead or as a sealant bead when the corrugation sheet/facing sheet is generated, a width on the narrower end of the range be usable.

V. A Preferred Z-Filter Media Coiling Process

Figure 21:
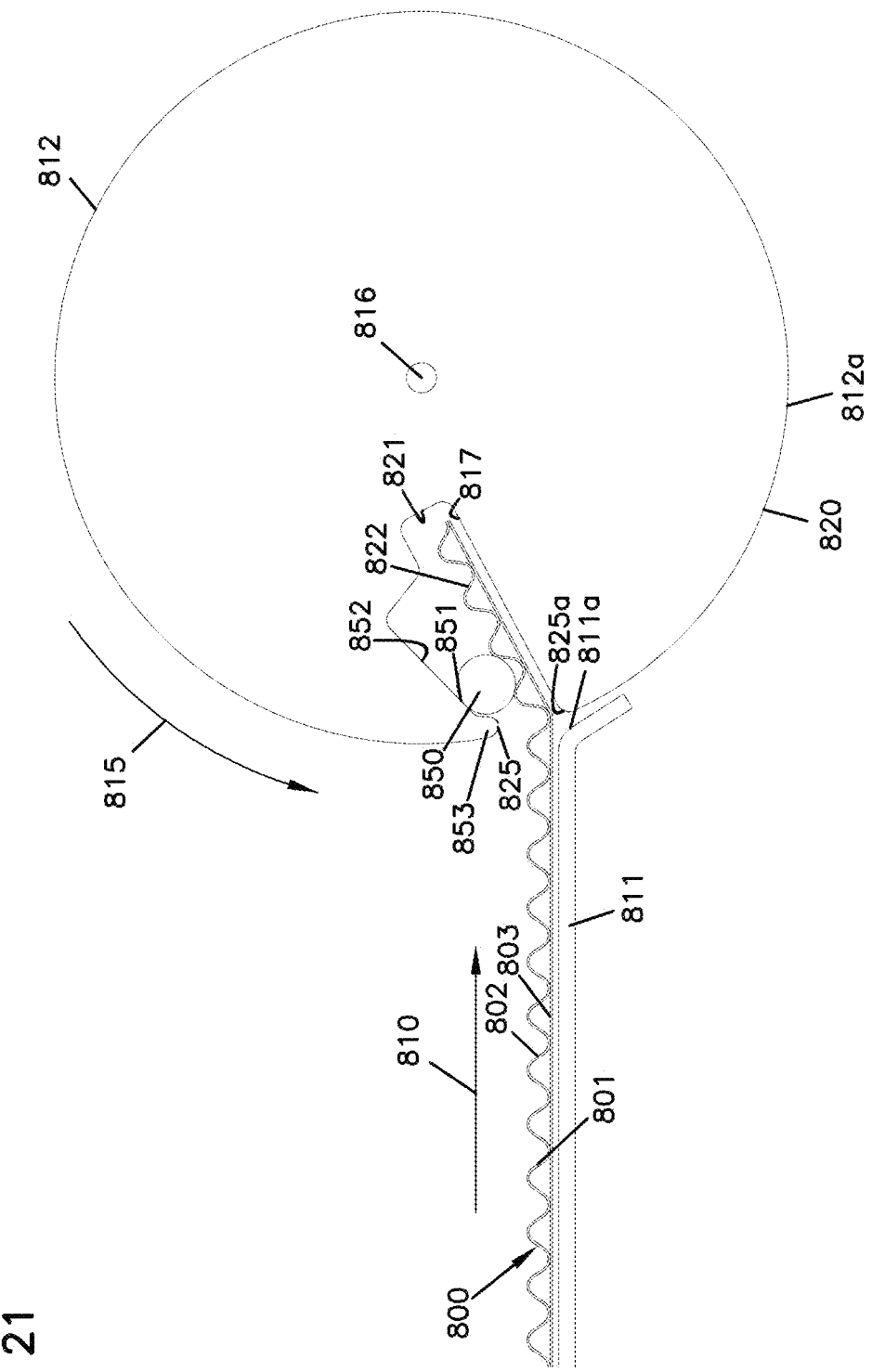
FIG. 21 is a schematic depiction of a preferred process for use in coiling corrugated media-facing sheet combination, to provide preferred filter cartridges according to the present disclosure.

Attention is now directed to FIG. 21. FIG. 21 is a schematic depiction of a useful media coiling process. Referring to FIG. 21, strip 800 of media 801 to be coiled, is shown. The media 801 comprises a fluted, in this instance, corrugated, sheet 802 secured to a non-fluted, non-corrugated, facing sheet 803. The two are preferably secured together with a front side sealant bead or strip utilizing a urethane (preferably foamed) sealant, although alternatives are possible. The media strip 800, during the process, generally moves in the direction of arrow 810. The media strip 800 is shown positioned on a media guide 811. The media strip 800 may be in accord with the variations described or referenced herein. Thus, it could, for example, have flutes with folded ends.

The processing equipment for the coiling generally comprises a media winding mandrel or hub 812. The diameter of the winding hub 812 will be selected to provide a desired diameter for central opening 411, FIG. 11. The media winding hub 812 is mounted to rotate, in this instance in the direction of arrow 815 around a center axis 816. The hub 812 includes a media catch slot 817 therein. The media catch slot 817 extends a distance, from an outer perimeter 820 to an inner most recess 821, corresponding to a preferred length for inside tail 822 of media 801 during a winding process. Typically a length for tail 822 will be at least 0.75 inch, usually at less 1 inch, for example 1.25-2.5 inches.

In general, the media winding hub 812 is initially positioned such that mouth or gap 825 at an outer edge 820 of media catch slot 817 is positioned to receive media strip 800 as it moves in the direction of arrow 810. A locking pin or similar structure, not shown, can be utilized to maintain the winding hub 812 in this rotational orientation relative to the media guide 811, during projection of media end 822 into catch slot 817. In FIG. 21, the winding hub 812 is shown positioned in a media receiving orientation. That is the hub 812 is positioned with gap 825 oriented with lower edge 825a positioned adjacent end 811a of media guide 811, so that media 801 moving in the direction of arrow 810 will enter slot 817.

During a winding operation, the media strip 801 is pushed into the media catch slot 817 a selected distance which can be controlled with automated equipment monitoring the timing of insertion allowed before the winding hub 812 rotated.

In preferred assemblies and practices, a media catch arrangement is provided to secure the media tail 822 in slot 817, during a winding operation. The media catch arrangement may comprise a variety of alternate mechanical constructions. In general all that is needed is a convenient arrangement to hold tail 822 in place, during the winding or coiling.

A particular convenient media catch arrangement utilizes a catch or lock piece which can be pushed out of the way as the media end 822 is inserted, and which catches the media end 822 against reverse pull. The particular arrangement depicted, utilizes a floating media locking roller 850 for this purpose.

The media locking roller 850 is operably positioned within the catch slot 817. In particular, portion 851 of the catch slot 817 includes a groove 852 therein, with a front catch 853, to maintain roller 850 in the groove 852. The axial length of roller 850 is typically less than the axial length of the groove 817. For example, the roller 850 may only extend over about one-third of the axial length of the winding hub 812, whereas in general the catch slot 817 would extend the entire length or nearly the entire length, of the roller 812.

The diameter of the media locking roller 850 can be selected to be large enough so that it doesn't fit into end 855 of catch slot 817. Further, the diameter is selected so that roller 850 will tend to nest, partially, between media corrugations, as shown, inhibiting the ease with which the media strip 810 can be pulled out of the media catch slot 817. As a result, the floating media locking roller 850 will help hold tail 822 of the media strip 801 is position, during coiling.

After the media strip 801 is directed sufficiently far into the media catch slot 817, and the media locking roller 850 is in place, the winding hub 812 can be rotated to wind or coil the media 801 around outer surface 812a. Preferably the winding is with the facing sheet 803 directed out, and the corrugation sheet 802 directed in. The winding will continue a sufficient number of times to produce the desired wound coiled media construction. Typically, the media strip 800 is cut to a particular length, prior to coiling. Thus, coiling typically continues until the complete strip length is taken out. In alternate processing, the media could be cut after a sufficient or defined amount of coiling has occurred. A backside sealant strip, or bead, could be applied before or during the winding process. Some preferred sealant beads are described below.

After coiling around hub 812, the resulting media coil can be slid from the winding hub by axial movement or ejection, for example (in reference to FIG. 21), toward the viewer. The media guide 811 can be positioned and configured to be moved out of the way, during this step. The portion of the media strip after coiling, which corresponds to the portion 822 contained with the catch slot 817, after removal from the winding hub 812, will rest back against an inside surface of the coil, to provide a coil generally as shown in FIG. 11 at 410. The locking roller 850, does not interfere with axial ejection of the media coil from the hub 812.

The resulting coil 410, FIG. 11, can be distorted to an obround shape 440, as described above with respect to FIG. 11. In some instances it may be desired not to have an interdigitated racetrack shape result. To avoid interdigitation adjacent the backside sealant bead, all that is generally required is to put a temporary center piece such as a flat sheet inside of opening 411, FIG. 11, before distortion or crushing to the racetrack shape. For example 1/16 inch thick plastic sheet (preferably a polyolefin to which urethane does not stick well) could be used, having a width corresponding to the diameter of region 411. The sheet would not typically project all the way through the axial length of the coiled media, since interference with the backside sealant bead should be avoided. In general, it would be inserted into an end remote for the backside sealant bead, to stop, short of the backside sealant bead, for example at a position about one-quarter inch to two inches from the end of the sealant bead depending on how much foaming is expected. After the urethane of the backside sealant bead is sufficiently set, the temporary center piece could be removed, to provide for a coiled media construction having no added center piece and which also is not interdigitated, especially at least at the end corresponding to the backside sealant bead. In some instances avoidance of interdigitation, at least at this end, can provide advantage with respect to dust load in the resulting filter element.

As explained previously, when a foamed urethane is used for the backside sealant bead, after coiling the foaming action of the sealant will increase its volume. In general it is preferred to space the backside sealant bead sufficiently away from the nearest edge of the media, so that as the material foams, it does not bubble outwardly from the edge of the media. Typically a spacing of about 0.25 inch-1.0 inch will be sufficient, depending upon the amount of sealant in the bead.

In some instances it may be desirable to apply a greater amount of sealant in selected portions of the backside sealant bead, than in others. Two locations where it may be desirable to apply more sealant, are adjacent to lead front end 413, FIG. 11, and immediately adjacent the tail end 414, FIG. 11. With respect to the front end 413, it may be desirable to have more sealant bead within the first one to three windings along the inside of the racetrack shape, for example. If the amount of sealant in this location is to be increased, it may be desirable to position the backside sealant bead, at this location, further away from the nearest edge, than at locations where less sealant is used, to avoid undesirable bubbling of the foaming sealant out, during cure.

Again, it may be desirable to provide a greater amount of sealant in the last outside wind adjacent the tail end 414, FIG. 11. At this location, it may be desirable to similarly position the backside sealant bead further away from the nearest adjacent media edge, than at other locations.

The sealant bead modifications at both ends 413, 414 can be made with a continuous process of sealant bead application, with gradual movement of the sealant bead with respect to its distance from the nearest edge.

The techniques described in connection with FIG. 21, can be applied with a variety of z-filter media arrangements. Preferred arrangements will be ones which have urethane sealant as both the front side sealant bead and the back side sealant bead, in accord with the descriptions herein. However, alternate seal arrangements are possible.

In general, then, methods of preparing a z-filter media construction including coiled z-filter media are provided including steps according to the processes of FIGS. 11 and 21. The typical process comprises using z-filter media comprising a fluted, and preferably corrugated, sheet secured to a non-fluted non-corrugated facing sheet. The method generally includes steps of: (a) guiding a front end extension of a strip of z-filter media into a media catch slot of a winding hub; (b) in follow up, coiling the strip of media around the outside of the winding hub, with the facing sheet directed outwardly, to form a resulting media coil; and (c) removing the resulting media coil from the winding hub. The method typically includes extending the media at least 0.75 inch into the catch slot, preferably at least 1.0 inch.

Preferably the winding includes at least 6 coils, or involves winding around at least 6 times, more preferably at least 10 times.

The step of winding can be conducted by rotating the hub, if desired.

Preferably the winding is conducted using a strip that has both a front side sealant strip and a backside sealant strip, most preferably at least the backside sealant strip is a foamed polyurethane.

After the resulting coil has been removed from the winding hub, it can be distorted to an obround configuration, preferably with no added center piece retained with the media during filtering. The obround configuration is preferably racetrack shape. In some instances it may be distorted to a racetrack shape having interdigitated flutes. In other instances, a temporary center piece can be positioned within a center opening of the resulting coil, prior to distortion. After the step of distortion, the temporary center piece can be removed, so that a racetrack shaped obround filter element not having interdigitated flutes at least adjacent the backside sealant bead, and having no added center piece results.

According to the present disclosure, coiled z-filter media constructions made in accord with the various processes and techniques described herein, are defined and preferred.

It is noted that as characterized herein with respect to FIGS. 12-16, along center strip of a racetrack shape having no added center piece, there is provided a first turn between two relatively straight strips, 512, 514 (FIGS. 13 and 14) of corrugated media. Typically at this turn, three corrugations are used to make the turn, although alternatives are possible. It has been observed that three corrugations can fit together, due to their shapes, to provide for a preferred turn.

It will be understood that the techniques or principles and examples provided, can be provided and used in a variety of specific manners, to accomplish the desired results. The drawings and descriptions are intended to be exemplary only.

What is claimed is:

1. An air filter cartridge comprising:
   (a) a filter media construction comprising a coiled configuration of fluted filter media secured to facing media;
      (i) the media construction having a shape with two, opposite, generally parallel, sides joined by curved end portions; and,
      (ii) the filter media construction having a straight center strip at least 6 cm long extending generally parallel to the two, opposite, generally parallel sides;
   (b) a housing seal comprising a framework positioned surrounding the media construction and having a housing seal member thereon;
      (i) the housing seal member having first and second, opposite, straight, sides, one each in overlap with a respective one of the two generally parallel, opposite, sides, of the filter media construction;
      (ii) the housing seal member having at least two, straight, sections each extending non-parallel to, and non-perpendicular to, the straight center strip of the filter media construction; and,
(iii) the housing seal member comprising polyurethane; and,
(c) the center strip having at least six interdigitized flutes.

2. An air filter cartridge according to claim 1 wherein:
(a) the filter media construction includes opposite flow faces; and,
(b) the framework includes a portion extending across one of the flow faces.

3. An air filter cartridge according to claim 1 wherein:
(a) the center strip comprises at least 15 interdigitized flutes.

4. An air filter cartridge according to claim 1 wherein:
(a) the center of the filter media construction is closed by a sealant that increased in volume at least 40% during cure.

5. An air filter cartridge according to claim 4 wherein:
(a) the center of the filter media construction is closed by polyurethane.

6. An air filter cartridge according to claim 1 wherein:
(a) the housing seal member has at least one straight perimeter sections extending perpendicular to the center strip.

7. An air filter cartridge according to claim 6 wherein:
(a) the housing seal member has at least two straight perimeter section extending perpendicular to the straight center strip.

8. An air filter cartridge according to claim 1 wherein:
(a) the filter media construction includes opposite, parallel, flow faces; and,
(b) the framework includes a portion extending across one of the flow faces.

9. An air filter cartridge comprising:
(a) a filter media construction comprising a coiled configuration of fluted filter media secured to facing media;
(i) the media construction having a shape with two, opposite, generally parallel, sides joined by curved end portions; and,
(ii) the filter media construction having a straight center strip at least 6 cm long extending generally parallel to the two, opposite, generally parallel sides;
(b) a housing seal comprising a framework positioned surrounding the media construction and having a housing seal member thereon;
(i) the housing seal member having first and second, opposite, straight, sides, one each in overlap with a respective one of the two generally parallel, opposite, sides of the filter media construction; and,
(ii) the housing seal member having at least two, straight, sections each extending non-parallel to, and non-perpendicular to, the straight center strip of the filter media construction;
(c) the filter media construction including opposite, parallel, flow faces;
(d) the framework including a portion extending across one of the flow faces; and,
(e) the center of the filter media construction being closed by a sealant that increased in volume at least 40% during cure.

10. An air filter cartridge according to claim 9 wherein:
(a) the center of the filter media continuation is closed by polyurethane.

* * * * *